July 8, 1969 D. P. HYNES ET AL 3,454,929
COMPUTER EDIT SYSTEM
Filed March 25, 1966
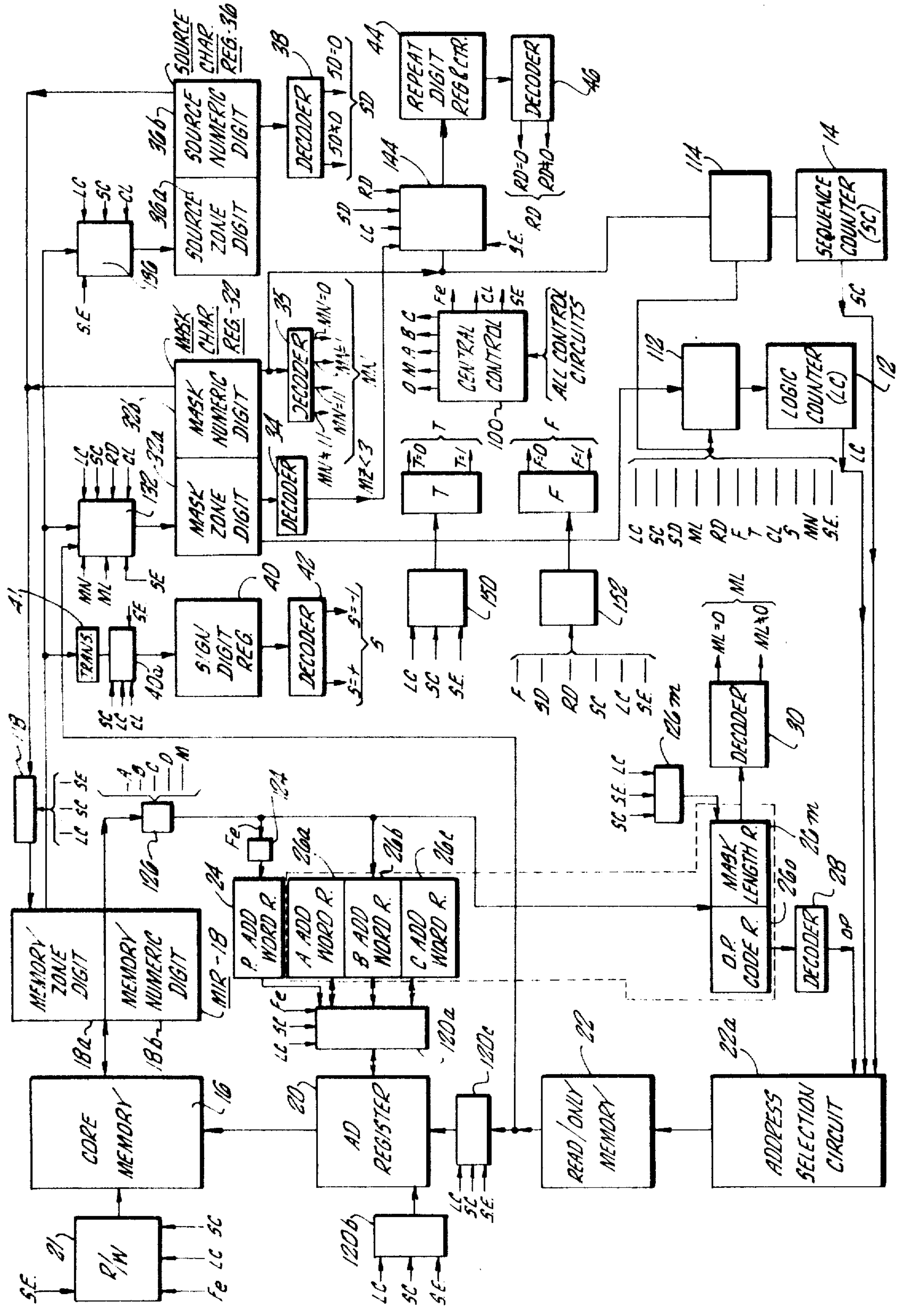

3,454,929
Patented July 8, 1969

3,454,929
COMPUTER EDIT SYSTEM

Donald P. Hynes, West Covina, and Donald E. Knuth, Sierra Madre, Calif., assignors to Burroughs Corporation, Detroit, Mich., a corporation of Michigan Filed Mar. 25, 1966, Ser. No. 537,344
Int. Cl. G06f 7/28
U.S. Cl. 340—172.5 27 Claims

ABSTRACT OF THE DISCLOSURE

In a computer a register for storing program instructions, a register for storing a series of edit operators and a memory. An editing means is responsive to an instruction stored in the instruction register for responding to a series of stored edit operators for transferring a source field of data in the memory to a destination field editing the source field as it is transferred.

This invention relates to digital computers and more particularly to an improved edit system for digital computers.

Edit instructions are commonly used in computers for transforming a source string of data into a destination string of data while performing certain transformations specified by a mask string of data. Common editing transformations are suppression of leading zeros and insertion of characters such as blanks, zeros, commas, decimal points and signs. Previous edit commands have used apparatus and a mask of string characters for use therewith which allow the programmer to do a few of these editing transformations. However, these mask characters are specific characters which severely limit the flexibility of the edit operation. For example, one common mask character of prior art computers is a $ sign which impliedly specifies that a $ sign is to be inserted in the source string being edited when the most significant character of the string being edited is reached and also impliedly specifies that if significance has not been reached a blank is to be inserted. One disadvantage of such an arrangement is that only specific prefixed characters can be inserted under specific conditions which severely limit the flexibility of the edit instruction. Thus, if it is desired to insert a £ symbol, rather than a $ sign, the computer must still have a $ sign mask operator. However, to print out a £ symbol, it would be necessary to translate the $ sign into a £ sign. This may require a translator or a time consuming programming technique to translate the $ sign to a £ sign. Also, most edit instructions in prior art computers require more than one pass through the data being edited.

The aforegoing disadvantages are overcome in the present invention, which includes a novel way to specify a mask string within an edit instruction. Increased flexibility of the editing operations is obtained and the system is not dependent on specific characters. Also, less expensive computer hardware is necessary to perform the editing functions. Further, the mask strings have less characters in most cases and less memory space is required for the mask strings. Only one pass is required through the source data being edited, thereby reducing edit time.

Briefly, an embodiment of the present invention comprises, a computer having apparatus for editing data. The combination comprises, register means for storing program instructions including an edit instruction for controlling the computer operation. Register means is provided for storing a series of edit operators. Memory means stores a source field of data to be edited and has storage locations for storing a destination field of data. Editing means is responsive to a stored edit instruction for responding to a series of edit operators stored in the edit operator register means for transferring the source field of data in the memoy means to the destination field in the memory means editing the source field of data as it is transferred in accordance with the stored edit operators.

These and other aspects of the present invention may be more fully understood with reference to the following description of the drawing.

Tables I through XVI are referred to in the following description. All tables are put together in consecutive order at the end of the specification for ease of reference thereto.

Refer now to the instruction format and the mask operator format.

A series of main instructions are used to control the computer operation. In the embodiment of the present invention, the instructions are three address instructions, having an operator and a field length. Table I shows the format of an edit instruction. The instruction includes an operator code, a field length, an A-address, a B-address and a C-address. In the case of the edit instruction, the operator code is a combination of binary coded bits which specifies the computer is to edit. The field length of an edit instruction specifies the number of characters in a mask field. The A-address specifies the beginning address of a source field. The B-address specifies the beginning address of a mask field. The C-address specifies the beginning address of a destination field. The source field is composed of data which is to be transferred to the destination field while being edited in accordance with mask operators in the mask field.

The mask field is composed of a series of single character operators. Table II illustrates the format of a mask operator. The mask operator is composed of two 4-binary bit digits making up one character. One digit is referred to as the *m* digit and the other digit, the *a* digit. The *m* digit of a mask operator is a general edit operator which specifies any one of a number of different edit operations. The *a* digit of a mask operator has a number of different meanings depending on the type of *m* digit in the mask operator. For example, the *a* digit may be a repeat value specifying the number of times the *m* digit operation is to be repeated or the *a* digit may have a control meaning which, together with the *m* digit, specifies a particular operation. Also the *a* digit may be a pointer pointing at a particular location in a table in memory where constant symbols, such as $ signs, · , b̸, etc., are stored.

Table III shows the various *m* values of the mask operators. For example, the *m* value may specify MOVE CHARACTER ($m=1$), MOVE SUPPRESS ($m=2$), IN- SERT UNCONDITIONALLY ($m=3$), INSERT ON PLUS ($m=4$), INSERT ON MINUS ($m=5$), INSERT SUPPRESS ($m=6$), INSERT FLOAT ($m=7$), END FLOAT ($m=8$) and CONTROL ($m=9$).

Mask operators with $M=1$ or 2 for MOVE CHARACTER or MOVE SUPPRESS are mask operators in which the *a* characters of the mask operators have a repeat meaning. In other words, the *a* value of the mask operator designates the number of times the *m* operation is to be repeated.

Mask operators with $M=3$, 4, 5, 6, 7 or 8 are ones wherein the *a* digit is a pointer or identifier which identifies a particular location in a constant table stored in memory. The mask operator wherein the *m* value is 9, is one wherein the *a* digit has a control meaning. Specifically, when the *m* value is 9, a flip-flop is set to a "0" state or "1" state to indicate that the most significant digit of a source field being edited has, or has not, been reached. The particular operations performed for each mask operator are described in Table III.

Source data to be edited is stored in a string of characters in a memory. Each character has two 4-bit binary coded bits. The most significant digit of the source character is a zone digit. The zone digit is used to convert numeric digits (with 4-bits) into characters with 8-bit format for use in peripheral devices such as printers, card punches, etc. To be described in more detail, the zone digit of the source character is represented by the symbol Z.

Consider now the circuits shown in the drawing. The basic timing for the computer system is provided by a logic counter 12 and a sequence counter 14. Other miscellaneous control and timing circuits include a T flip-flop and an F flip-flop. The main memory for the computer is a magnetic core memory 16. Associated with the magnetic core memory 16 is a memory information register, hereinafter referred to as the MIR register 18. Also associated with the memory 16 is an address register, hereinafter referred to as the AD register 20. The memory 16, MIR register 18 and AD register 20 form a conventional magnetic core memory system in which the AD register 20 stores addresses of various locations in the memory 16 and in which the information being read out of the addressed locations and being stored in the addressed locations are all transferred through the MIR register 18.

A memory read/write control circuit 21 provides the basic read and write control for the memory 16. The read/write control circuit 21 may be of any one of a number of conventional control circuits, the operations of which is described in more detail in a subsequent description.

An instruction register 26 stores the main instructions for controlling operation of the computer system. The format of a main instruction word is shown in Table I. The instruction register 26 comprises a register **26*o* for storing the operator code, a mask length register 26*m* for storing the field length and A, B and C address word registers 26*a*, 26*b* and 26*c*** for storing A, B and C addresses of such instruction.

A decoder 28 decodes the operator code stored in the operator code register **26*o* and provides an output corresponding to the particular operator code contained therein. A decoder 30 decodes the value stored in the register section 26*m* and provides an output corresponding to whether the value is zero or is not zero. The decoder 30 provides outputs at $ML=0$ and $ML\neq0$, when the value contained in the mask length register 26*m*** is zero, and not zero, respectively.

A program address word register 24 is provided for addressing the characters of a main instruction contained in a program composed of instructions stored in the memory 16.

A mask character register 32 receives and stores mask operator characters read from the core memory 16. The mask register 32 has a zone digit register **32*a* and a numeric digit register 32*b*** for storing the *m* and *a* portions of a mask operator character. A decoder 34 is connected to the zone digit register **32*a*** and provides a signal at $MZ<3$ output circuit thereof whenever the value of the *m* digit is less than 3. A decoder 35 is connected to the mask numeric digit register **32*b*** and provides output signals at $MN=0$, $MN=1$, $MN=11$, and $MN\neq11$ outputs thereof when the *a* digit contained in **32*b*** has values of 0, 1, 11 and any value other than 11, respectively.

A source character register 36 is provided for storing source characters being transferred between a source field and a destination field in the core memory 16. The source register 36 has a source zone digit register **36*a* and a source numeric digit register 36*b*. The source zone digit register 36*a* stores the zone digit of a source character, whereas, the source numeric digit register 36*b* stores the numeric portion of a source character. A decoder 38 is connected to the source digit register 32*b*. The decoder 38 provides signals at its output circuits $SD=0$ and $SD\neq0$ when the content of the source of the source digit register 32*b*** is equal to zero and not equal to zero, respectively.

A sign digit register 40 stores the sign of a number under certain conditions. These conditions are described more fully in a subsequent description. A decoder 42 is connected to the sign digit register 40 and has output circuits $S=+$ and $S=-$ at which signals are formed when the code contained in the register 40 represents a plus sign and a minus sign, respectively.

The zone digit of a source character carries the sign information of a character. When a source character is read from memory 16, the zone digit is stored in the zone digit portions **18*a* of the MIR register 18 after being read from memory 16. A translator 41 decodes the zone digit of a source character stored in the 18*a* portion of the MIR register 18 and forms a signal indicative of whether the zone digit represents a + sign or a − sign. A gate 40*a* causes the signals formed by the translator 41 to be stored in the sign digit register 40**.

A repeat digit register and counter 44 is provided for storing the *a* value of a mask operator when the *a* digit represents a repeat value. The repeat digit register and counter 44 counts relative to the repeat value stored therein until it reaches zero. A decoder 46 is connected to the repeat digit register and counter 44 and provides digit signals at $RD=0$ and $RD\neq0$ outputs thereof when the value in 44 is zero and not zero, respectively.

The following abbreviations are used for the indicated outputs shown in the drawing: LC for all outputs for the fifteen states of logic counter 12, SC for all outputs for fifteen states of sequence counter 14, $S=+$ and $S=-$ for decoder 42, MN for $MN=0$, $MN=1$, $MN=11$, $MN\neq11$ of decoder 35, $SD\neq0$ and $SD=0$ for the decoder 38, $RD=0$ and $RD\neq0$ for the decoder 46, $ML=0$ and $ML\neq0$ for the decoder 30, $T=0$ and $T=1$ for the T flip-flop, F $F=0$ and $F=1$ for the F flip-flop.

Central control in the circuitry in the computer system provides the basic logical control for sequencing the operation of the computer system. It causes characters to be transferred from the source to the destination fields and causes the source data to be edited. The required logic is shown in descriptive form in Table IV. To differentiate between the portions of central control which control and sequence the operation of the computer system and the registers and decoders, previously described, reference numerals 100 and above are used to reference the central control circuits 100 which provide various controls in the computer system. The circuits which cause new instructions to be fetched from memory 16, cause various selected registers to be cleared at the beginning of each command, and cause the computer system shown in the diagram to respond to mask operators during execution of an edit instruction, are the central control circuits 100.

Central control circuits 100 have inputs from all registers, decoders, flip-flops and counters in the system and generate control signals at outputs A, B, C, O, M, F*e*, CL, and SE. The construction and operation of central control circuits 100 is described more fully in Table IV and the subsequent description pertaining thereto.

A logical gating circuit 120*a* has iput circuits connected to the output circuits LC, SC and F*e* of the logic counter 12, sequence counter 14 and central control circuits 100. The gating circuits 120*a* store addresses from the address registers 26*a*, 26*b* and 26*c* into the AD register 20 and store addresses stored in the AD register 20 into the register 26*a*, 26*b* and 26*c*. The registers between which addresses are transferred by the gating circuit 120*a* is determined by the states of the logic counter 12, sequence counter 14 and the control signal at F*e*.

A gating circuit or control circuit 20*b* is provided for counting the address contained in the AD register 20 up by two addresses.

The core memory 16 reads and writes a character comprising two 4-bit digits in parallel. The address register 20 addresses two digits or one character of storage in the core memory 16 causing such character to be read out. There is one address for each digit of storage. For purposes of explanation, the core memory 16 is addressed with only even addresses, i.e. address 100, 102, 104, etc. and one character or two digits are stored for each address. Therefore, the logic and control circuit 120*b* counts the value contained in the AD register 20 up by two units to arrive at the next subsequent even address in sequence.

A read only type of memory 22 is provided which permanently stores certain constants and forms outputs corresponding to the stored constants at an output circuit thereof. The read only memory 22 is a conventional resistor type of read only memory and has an address selection circuit 22*a* connected thereto which selects the various storage locations causing the content thereof to be read out. The address selection circuit 22*a* is controlled by the OP, LC and SC outputs of the decoder 28, the logic counter 12 and the sequence counter 14. The particular memory location in 22 that is addressed by the selection circuit 22*a* is controlled by the state of the sequence counter 14, logic counter 12, and decoder 28.

A gating circuit 120*c* is provided for storing the output of a read only memory 22 into the AD register 20. The gating circuit 120*c* is controlled by the outputs LC and SC of the logic counter 12 and the sequence counter 14.

A gating circuit 118 is associated with the MIR register 18. The gating circuit 118 stores the content of either the mask character register 32 or the source character register 36 into the MIR register 18. The gating circuit 118 has control circuits connected to the output circuits LC and SC from the logic counter 12, sequence counter 14 for controlling the operation thereof and to determine the registers from which a character is to be obtained.

A gating circuit 126 is associated with the instruction register 26. The gating circuit 126 stores characters from the MIR register 18 into one of the register sections 26*a*, 26*b*, 26*c*, 26*o*, and 26*m*, depending on control signals applied to the gating circuit 126. The gating circuit 126 has control circuits connected to the output circuits of central control 100 indicated in the diagram. Control signals at the A, B, C, O, M output circuits, respectively, cause characters to be stored in the A, B, C, operator, and mask length registers 26*a*, 26*b*, 26*c*, 26*o* and 26*m*, respectively.

A count control circuit 126*m* is connected to the mask length register 26*m* and causes the mask length value stored in the register 26*m* to be counted down by one unit under certain conditions. The conditions are determined by the output signals at LC and SC from the logic counter 12 and the sequence counter 14.

A count control circuit 124 is associated with the program address word register 24. The count control circuit 124 causes the program address word register to be counted up by two units in response to control signals at the F*e* output of central control 100.

Control circuit 112 is provided for controlling the operation of the logic counter 12. Control circuit 112 contains gating circuitry which causes the logic counter 12 to either count or be set to a value or store the content of the mask zone digit register 32*a*. The control circuit 112 is controlled by the following output circuits:

LC from logic counter 12, SC from sequence counter 14, SD from decoder 38, ML from decoder 30, RD from decoder 46, F from flip-flop F, T from flip-flop T, CL from central control circuits 100, S from decoder 42, and MN from decoder 35.

A control circuit 114 is associated with the sequence counter 14 and for counting the content thereof up for setting it to a value, or storing the content of the mask numeric digit 32*b* into it. The control circuit 114 has inputs from the same output circuits as the logic and count control circuit 112 for controlling operation thereof.

A gating circuit 132 is associated with the mask register 32. The gating circuit 132 stores a character from the MIR register 18 or a character from the output of the read only memory 22 into the mask character register 32. The gating circuit 132 is controlled by outputs LC, SC, RD and CL, MN and ML from the logic counter 12, sequence counter 14, the decoder 46, the central control 100, the decoder 35, and the decoder 30. The control signals to the gating circuit 132 not only control the time at which a character is stored, but determine the register from which the character is to be stored.

A gating circuit 136 is associated with the source character register 36. The gating circuit 136 stores a character from the MIR register 18 into the source register 36. The gating circuit 136 is controlled by the outputs LC, SC and CL from the logic counter 12, sequence 14, and central control 100.

The gating circuit 140 mentioned in connection with the translator 41 stores the output of the translator 41 into the sign digit register 40. The gating circuit 140 is controlled by the outputs LC, SC and CL from the logic circuit 12, sequence counter 14, and the central control circuits 100.

A gating circuit 150 is coupled to the T flip-flop. The gating circuit 150 sets the T flip-flop into either a "0" state or a "1" state depending on the states of the logic counter 12 and the sequence counter 14.

A gating circuit 152 is associated with the F flip-flop. The gating circuit 152 causes the F flip-flop to be set into either a "0" state or a "1" state under control of signals at the outputs LC, SC, F, SD and RD from the logic counter 12, the sequence counter 14, the F flip-flop, and the decoding circuits 38 and 46.

All of the gating and control circuits bearing reference numerals above 100 described heretofore and the read/write control circuit 21 have an input connected to the SE output of the central control circuits 100. The central control circuits 100 are responsive to a signal from decoder 28 to form a signal at the SE output. The signal at the SE output causes the various gating and control circuits to which it is connected to carry out the operations indicated in Table IV below the line labelled START EDIT (SE). In so doing, the computer system executes the series of mask operators stored in the mask operator register 32.

*Operation*

Table IV describes the structure of the logical circuits bearing reference numerals 100 and above as well as illustrating the sequence of the operation of the computer system shown in the drawing.

Before considering examples of operation, some of the abbreviations used in Table IV should be noted. COUNT $SC+1$ indicates that the sequence counter 14 is to be counted up by one state. LC and SC are abbreviations for logic counter 12 and sequence counter 14. $LC=0$, $LC=1$ . . . through $LC=15$ are used to indicate the output signals of the logic counter 12 corresponding to its fifteen states of operation. By way of examples, $LC=0$ is formed when the logic counter 12 is in state "0" and a control signal is formed at $LC=15$ when the logic counter 12 is in state 15. The output circuits $LC=0$ through $LC=15$ are not specifically shown in the drawing, instead, for purposes of simplification, these output circuits are all indicated by the general symbol LC at the output of the logic counter 12 and the input to the various circuits in which used.

Similar to the symbols LC, the symbols $SC=0$ through $SC=15$ represent the output circuits of the sequence counter 14 which receive control signals when the sequence counter 14 is in the corresponding states of operation. Similar to the logic counter 12, the output circuits $SC=0$ through $SC=15$ are not specifically shown in the drawing but are illustrated by the general symbol SC in the drawing.

SET $LC=1$, SET $LC=2$, etc. is used to designate the states into which the logic counter is set in response to the indicated control conditions. Similarly, SET $SC=1$, SET $SC=2$, etc. are used to indicate the various states into which the sequence counter 14 is set in response to the indicated control conditions.

Other SET conditions used in Table IV are SET MASK ZONE REGISTER=1 which indicates that the mask zone digit register **32*a***, alone, is to have a decimal digit one stored therein. SET $F=1$ and SET $F=0$, SET $T=1$, SET $T=0$ indicate the F and T flip-flops are set into 1 and 0 states under the indicated control conditions.

COUNT REPEAT DIGIT $-1$ is used to designate that under the indicated control conditions the content of the repeat digit register and counter 44 is counted down by the logic circuitry 144.

COUNT AD REGISTER $+2$ is used to indicate that the gating circuit **120*b* causes the AD register 20 to count the address contained therein up two units. Similarly, COUNT MASK LENGTH $-1$ indicates that the content of the mask length register 26*m* is counted down by one unit under control of the gating circuit 126*m*** under the indicated control conditions.

The beginning of Table IV indicates a FETCH & CLEAR operation wherein a main instruction is read from memory 12 and stored into the instruction register 26 and wherein the other registers and counters in the system are cleared or set to zero. During the fetch and clear operation, the only effective control signals are those referenced by the symbols O, M, A, B, C, *Fe* and CL. These controls cause the instruction to be fetched from core memory 16 and stored in the instruction register 26 and cause the various registers and counters to be cleared as more fully described during the description of an example of operation hereinafter.

Following the FETCH & CLEAR operation Table IV is organized according to the signal at SE and the states of logic counter 12 and the sequence counter 14. During the entire execution time of an edit instruction, central control 100 forms a control signal at its output circuit SE. Table IV illustrates the signal at SE positioned slightly to the left of each of the LC and SC terms in Table IV which appear below the SE symbol. This arrangement indicates that the signal at SE is required as a logical "and" term with the LC and SE terms appearing below the SE symbol in the table to cause the sequence of operations following it to be carried out.

Immediately below the SE symbol the symbols $LC=0$, $LC=1$, $LC=2$, etc. appear. It will be noted that these symbols are displaced slightly to the left of each of SC symbols which follow. This position of an LC symbol indicates that it is required as an "and" condition with the SC terms which follow and appear in between the particular LC symbol and the next following LC symbol. For example, SE and $LC=0$ are logical "and" terms with $SC=0$ for the operation of SET ADDRESS WORD INTO AD REGISTER. READ MEMORY TO MIR. COUNT $SC+1$.

Referring back to $LC=0$, $SC=0$, it will be noted that below and slightly to the right of the $SC=0$ term, the descriptive matter noted above is set forth. The descriptive matter describes the logical circuitry and illustrates the sequence of operation of the various parts of the computer system shown in the drawing. For example, following $LC=0$, $SC=0$, Table IV states SET A-ADDRESS WORD INTO ADDRESS REGISTER. This indicates that the A-address word contained in the A-address word register **26*a* is stored into the AD register 20 by the gating circuit 120*a*. The gating circuit 120*a*** performs such operation in response to the logical "and" condition of the signals at SE, $LC=0$ and $SC=0$.

Continuing with Table IV under SE, $LC=0$, $SC=0$, it is stated READ MEMORY TO MIR. This indicates that the read/write control circuit 21 is to cause the core memory 16 to read out the content of the address now stored in the AD register 20, causing the content of the address to be stored in the MIR register 18. The read/write circuit 21 again operates under control of the logical "and" condition of signals at SE, $LC=0$ and $SC=0$.

The operation and construction of the computer system will be evident by following the logical conditions and operations described in Table IV and the examples described hereinafter.

Table V shows an example of the symbols stored in each storage location of the constant table. The core memory 16 has storage locations or address 48 through 62 reserved for the constant table. These locations correspond to "*a*" digit values of and sequence counter states of 0 through 7. Table V applies to all examples explained herein.

FIRST EXAMPLE, TABLES VI, VII, VIII, IX

Consider now an example of operation for the edit instruction and mask field shown in Table VI. Referring to Table VI it will be noted that A, B and C fields start at memory addresses 100, 200 and 300, respectively, and that the mask field is five characters long. At the bottom of Table VI the prior art COBOL FIELD for performing the same edit instructions is depicted. As indicated, the specific character symbols $ sign and , are needed to perform the required editing operations. This is in contrast to the present invention wherein general mask operators are used. Additionally, it will be noted that the prior art COBOL FIELD requires six characters, minimum, to perform the editing operations, whereas, in the present case the mask field is only five characters in length.

Table VII illustrates the content of memory 16 for the instruction and mask fields shown in Table VI. Under the column labelled SOURCE FIELD, the data to be edited is shown as it is stored in addresses 100 through 106. Under the column labelled MASK FIELD, the mask field is shown as it is stored in addresses 200 through 208. Under the column entitled DESTINATION FIELD, the contents of the destination field addresses 300 through 310 are shown with the edited data stored therein.

As indicated in Table VII the source field of data to be edited Z0, Z0, Z2 and Z1 has to be edited so that when it is printed out by a printer it will appear as $21. In order to accomplish this result, the destination field which is six characters in length needs to contain three leading characters representing blanks, a dollar sign and the numerals 2 and 1. The symbols b is used to represent a blank symbol. Due to the nature of the peripheral equipment such as printers, card readers, etc. which receive the destination field, it is necessary to place the edited data in alpha-numeric format, rather than numeric format. To this end, the symbols Z are placed in front of each of the characters in the source field so that the characters are in that format when received by the peripheral devices.

Table VIII shows the mask operators in the MASK FIELD column of Table VII and at the right gives a summary description of the operation performed by each of the mask operators. Reference should be made to Table III for the type of operator the numbers represent.

Consider now the actual sequence of operation for the edit instruction, mask field and source field shown in Tables VI and VII. Table IX shows in detail the sequence of operation of the computer system shown in the drawing, while executing the edit instruction and mask field on the source data shown in Tables VI and VII. Table IX illustrates the sequence of operation in abbreviated form using the symbols for the states of the logic counter 12 and the sequence counter 14 shown in Table IV (SE is not shown). Referring now to Tables IV, VII and IX, initially the edit instruction is fetched and stored in the instruction register and the other registers and counters are celared to zero. To this end, a control signal is formed at CL causing the gates to which the CL control circuit is connected to clear the corresponding registers and counters to zero. The program word register 24 contains the address of the first character, the operator character of an edit instruction. A control signal is subsequently formed at the F*e* output followed by a signal at the 0 output. The control signal at the F*e* output causes the gating circuit **120*a* to store the program address word contained in register 24 into the AD register 20, causes the count control gate 124 to count the program address word contained in register 24 up by two units or one address and then causes the read and write control circuit 21 to read out the edit operator character stored in the memory location specified by the AD register 20. The character is read out and stored in the MIR register 18 and the subsequent control signal at 0 causes the gate 126 to store the edit operator character into the operator code register 26*o***.

Central control 100 forms signals at the F*e* and M output circuits causing the first character of the field length of the edit instruction to be read out and stored in the mask length register **26*m***. The signals at the F*e* and M output circuits are repeated and the second character of the mask field length is read and stored in the register **26*m***.

Subsequently, central control 100 forms signals at the F*e* and A output circuits causing the first character of the A-address of the edit instruction to be read and stored in the A-address word register **26*a***. The signals at F*e* and A are repeated until all characters of the A-address are read and stored in the A-address register **26*a***.

Subsequently, central control 100 forms control signals at the outputs F*e* and B output circuits. This causes the B-address word to be obtained from the core memory 16 in the same manner as the A-address word. However, since control signals are formed at the B output instead of the A output, the characters of the B-address word are stored in the B-address register **26*b*. After the B-address word is stored in the register 26*b***, control signals are formed at the F*e* and C output circuits causing the C-address word to be stored in the C-address register **26*c***.

At this point, the A, B and C-address word registers **26*a*, 26*b* and 26*c* contain the addresses 100, 200 and 300 which are the beginning addresses of the SOURCE FIELD, MASK FIELD and DESTINATION FIELD (see Table VIII). Additionally, the operator register 26*o* contains an edit operator and the mask length register 26*m*** contains the character "5" indicating that the mask field is five characters in length.

The operator decoder 28 decodes the edit operator stored in **26*o* and applies a signal to central control 100 indicating that the edit instruction is now to be executed. Central control 100 now forms a control signal at the SE output causing the computer system to execute the edit instruction contained in the instruction register 26**.

Following Tables IV and IX, the logic counter 12 and sequence counter 14 are initially at $LC=0$ and $SC=0$ but count up to states $LC=0$ and $SC=4$.

During $LC=0$ and $SC=0$, the first source character, character Z0, stored in the source field at 100 is read out and stored into the source register 36.

During $LC=0$, $SC=0$, the following actions take place: The gate **120*a* sets the A-address word (address 100) into the AD register 20 and the read/write circuit 21 causes the content of the address to be read out and stored in the MIR register 18. The gating circuit 114** counts the sequence counter up one to $SC=1$.

During $LC=0$, $SC=1$ the following operation takes place: The address in the AD register 20 is address 100, therefore, referring to Table VII, a Z0 is now contained in the MIR register 18. Although of no significance in this particular example, translator 41 forms a signal ($S=+$) corresponding to the sign of the character contained in the zone digit portion **18*a* of the MIR register 18 and the gating circuit 140*a* stores a signal corresponding thereto into the sign digit register 40. The gating circuit 120*b* counts the address contained in the AD register up by two units to address 102. The gating circuit 114** counts the sequence counter up to $SC=2$.

During $LC=0$ and $SC=2$, 3 and 4, the computer system obtains and stores the first mask operator (75) into the mask register 32.

During $LC=0$, $SC=2$, the following operations take place: The Z0 character (from address 100) contained in the MIR register is stored into the source register 36 by the gate 136, the incremented A-address, address 102, contained in the AD register 20 is stored into the A-address register **26*a* by the gate 120*a*, the B-address word, address 200 is stored into the AD register 20 from the B-address register 26*b* by the gating circuit 120*a* and the read/write control circuit 121 causes the memory 16 to read out the content of the B-address 200. The content of address 200 is the mask operator 75, therefore, the MIR register 18 now contains the mask operator 75. The mask length is 5, therefore, is not 0 ($ML \neq 0$) and the command is not ended. Therefore, the gate 126*m* counts the mask length contained in 26*m* down by one unit and the mask operator 75 contained in the MIR register 18 is stored into the mask register 32 by the gate 132. Also the gate circuit 120*b* counts the B-address contained in the AD register 20 up two units to address 202. The gating circuit 114** counts the sequence counter up one unit to $SC=4$.

During $LC=0$, $SC=4$ the following operations take place: The B-address, address 202, now contained in the AD register 20 is stored into the B-address register **26*b* by the gating circuit 120*a* and the mask edit operator 7 contained in the mask zone digit 32*a* is stored into the logic counter 12 by the gate 112** setting the logic counter to $LC=7$. The edit operator does not have a value less than 3 (MZ is not $<3$) therefore the mask operator is not a repeat type of operator and the *a* value contained in mask numeric digit register **32*b* is not stored into the repeat digit register and counter 44. The gate 114 causes the sequence counter 14** to be counted up to $SC=5$ and since the logic counter is set to $LC=7$, the computer system branches to $LC=7$, $SC=5$.

To abbreviate the following description, the action of the gates 112 and 114 in controlling the states of the logic counter 12 and sequence counter 14 is not described but the operation thereof will be evident with reference to Tables IV and IX.

During $LC=7$ and $SC=5$, the computer system branches to the portion of TABLE IV labelled INSERT FLOAT. Referring to Tables IV and IX, the logic counter 12 goes through a sequence of steps designated $LC=7$, $LC=4$ and $LC=2$ with the sequence counter 14 going through a sequence of states within each state of logic counter 12. During this operation the Z0 character previously read from memory location 100 is replaced with a symbol lb (which represents a blank) and the lb symbol is stored in memory location 300 (see Table VIII).

Various decisions made during an INSERT FLOAT are described in Table III and should be noted. In the example being described the most significant character of the field has not yet been reached. This is indicated by the T flip-flop being in state "0" ($T=0$). Table III indicates if significance has not been reached ($T=0$) and the source character is zero ($SD=0$) insert a blank lb in the destination field. The blank is a wired in type of symbol obtained from the read only memory 22.

Referring to Tables IV and IX during $LC=7$, $SC=5$, a signal is formed at $T=0$, therefore the sequence counter 14 goes to $SC=7$.

During $LC=7$, $SC=7$, the source digit previously read out and now contained in the source numeric digit register **36*b* is zero ($SD=0$), therefore the sequence counter 14** goes to $SC=8$.

During $LC=7$ and $SC=8$, 9, 10 and 11, certain decisions are made based on the fact the mask length is not zero ($ML\neq0$) and then the second source character Z0 in address 102 is read and stored in the source register 36.

Considering the details of operation during $SC=8$, $LC=7$, the mask length (ML) does not equal zero ($ML\neq0$). Therefore, the computer goes to $SC=9$ and the A-address word, address 102, is stored into the AD register 20 by the gating circuit **120*a*, the A-address location is read into the MIR register 18. During $SC=10$ the address 102 contained in the AD register 20 is counted up by two units so that it is now address 104. During $SC=11$ the address contained in the AD register 20 (address 104) is stored back into the A-address word register 26*a*. Also during $SC=11$ the second source character Z0 read out of address 102 and contained in the MIR register 18 is stored into the source character register 36 by the gating circuit 136. The logic counter 12 and the sequence counter 14** are now set to $LC=4$ and $SC=6$.

The computer system goes to $LC=4$ and $SC=6$ and $SC=10$ during which additional decisions are made. During $LC=4$ and $SC=6$ and $SC=10$ the digit contained in the mask numeric digit register **32*b* is not equal to 11 ($MN\neq11$) because the mask numeric digit register 32*b*** now contains the *a* digit of the mask operator 75 which is a digit 5. As a result, the SC counter is set to $SC=10$ and subsequently the logic counter 12 and sequence counter 14 are set to $LC=2$ and $SC=9$.

During $LC=2$ and $SC=9$, 12, 13 and 14, the character ƀ (blank) is read out from read only memory 22, stored in the mask register 32 and is subsequently stored in the destination address 300. Referring to Tables IV and IX, during $LC=2$, $SC=9$, the address selection circuit **22*a* addresses the read only memory 22 causing the symbol ƀ to be read out and the symbol ƀ is stored into the mask character register 32 by the gating circuit 132**.

During $LC=2$, $SC=12$, the C-address word, address 300, is stored into the AD register 20 by the gating circuit **120*a* and the character ƀ contained in the mask character register 32 is stored into the MIR register 18 by the gating circuit 118. Subsequently, the read/write control circuit 21 causes the character ƀ contained in the MIR register 18 to be written into the C-address 300 of the core memory 16**.

During $LC=2$, $SC=13$, the C-address contained in the AD register 20 is counted up by the gating circuit **120*b*. During $LC=2$, $SC=14$, the repeat digit is zero ($RD=0$) and the F flip-flop is in a zero state ($F=0$). The C-address contained in the AD register 20, now address 302, is stored back into the C-address word register 26*c* by the gating 120*a***.

During $LC=2$ and $SC=15$, $LC=0$ and $SC=3$, 4, the next mask operator which is 64 is obtained from memory and stored into the mask register 32. Accordingly, during $LC=2$, $SC=15$, the B-address word, address 202 is stored into the AD register 20 by the gating **120*a*. The read/write control 21 causes the mask operator 64 contained in address 202 to be read out and stored into the MIR register 18 and the logic counter 12 and sequence counter 14** are set to $LC=0$, $SC=3$.

During $SC=0$, $SC=3$ and 4 the mask length value in register **26*m* is 4 and, therefore, is not 0 ($ML\neq0$). Thus, the mask length value 4 contained in register 26*m* is counted down by one unit to value 3, the mask operator 64 contained in the MIR register 18 is transferred to the mask register 32, the address contained in the AD register 20 is counted up two units and the incremented B-address is stored back into the B-address register 26*b***, and the mask zone digit *m* contained in register **32*a* is stored into the logic counter 12. These operations are similar to that described in detail hereinabove. As a result, the computer system branches to $LC=6$, $SC=5$ for the mask operator 65** where an INSERT SUPPRESS operation is performed.

During $LC=6$, $SC=5$ the A, B, and C-address words are 104, 204 and 302, respectively, and the mask length is 3 ($ML=3$). Also, the mask operator stored into the mask register 32 is 64 designating that an INSERT SUPPRESS operation is to be performed. Referring to Table III, it will be noted that if significance has not been reached in the source field ($T=0$) the computer is to insert a blank ( b ) into the designation field.

Continuing with $LC=6$, $SC=5$ and making reference to Tables IV and IX, significance in the source field has not been reached, therefore, $T=0$ and the logic counter is set to $LC=4$ and the sequence counter is counted up to $SC=6$.

It will be recognized that this is the same condition as was reached during execution of the first mask operator 75. The logic counter 12 and the sequence counter 14 now go through a sequence of states with $LC=4$ and $LC=2$ identical to those described hereinabove in regard to mask operator 75. During these states another ƀ is read from the read only memory and is inserted into the destination field at address 302, the C-address 302 is incremented in the AD register 20 to 304 and address 304 is stored into the C-address word register **26*c***.

The computer system then repeats the states $LC=2$, $SC=15$ and $LC=0$ and $SC=3$ and 4 wherein the next mask operator, character 75, is obtained from the B-address 204.

Following $LC=0$, $SC=4$, the computer system again branches to $LC=7$, $SC=5$.

During the present state $LC=7$, $SC=5$, the A, B, and C-address word registers **26*a*, 26*b*, and 26*c* contain the addresses 104, 206, and 304, and the mask length register 26*m* indicates a length of two ($ML=2$). Also the mask operator 75 obtained from the B-address 204 is now stored in the mask character register 32. Again the mask operator 75, an INSERT FLOAT operator, causes the INSERT FLOAT operation to be performed. Accordingly, the sequence of operations indicated in Table IX between $LC=7$, $SC=5$ and $LC=2$, $SC=14$ are repeated causing the character ZO (from location 102) to be replaced with ƀ in the destination field at memory location 304 (see Table VII), causing the character Z2 to be read out from location 104 for storage in the source register 36 and causing the A and B-addresses to be incremented to 106 and 108**.

Subsequently, the computer system goes to $LC=0$, $SC=3$ and 4 and the mask operator 75 at the mask field address 206 is read out and stored in the mask register 32 and the mask length value 2 contained in register **26*m* is counted down one unit to value 1 to indicate that another mask operator has been read from the mask field. Also the content of the mask zone digit register 32*a***, the *m* digit of the mask operator, is stored into the logic counter 12 and the computer system is again at $LC=7$, $SC=5$.

The A, B and C address registers 26a, 26b, and 26c now contain the addresses 106, 208 and 306 and the mask length register 26m contains a value of 1.

During the subsequent steps of operation when the logic counter steps through the counts $LC=7$, $LC=3$, $LC=15$, and $LC=2$ to the point where $LC=2$, $SC=14$. The INSERT FLOAT operator now contained in the mask register 32 causes a different sequence of operation than that described hereinabove for the preceding INSERT FLOAT operator 75. The reason that a different sequence of operation is taken is that a different condition now exists. This different condition is that the most significant character of the source field Z2 (which is not zero) is to be operated on causing the INSERT FLOAT operator to control the operation of the system in accordance therewith.

Refer to Table III under INSERT FLOAT operation. It will be noted that if significance has not been previously reached ($T=0$) but the present source character is not "0," ($SD\neq0$), the computer is to insert the character in the $a$ location of the constant table into the destination field and then perform a MOVE CHARACTER operation. All previous source characters were Z0 and the T flip-flop is now in state "0." During the preceding state $LC=7$, $SC=9$ the most significant source character contaned in location 104, character Z2, was read out and is now stored in the source register 36.

Continuing with the operation, during $LC=7$, $SC=5$, $T=0$ SC is set to 7. During $LC=7$, $SC=7$ the source digit contained in the numeric digit register 36b is a digit 2 and, therefore, is not equal to 0, ($SD\neq0$). Therefore, the flip-flop is set to 1 and the logic counter and sequence counter are set to states 3 and 5, respectively.

The computer system is now at $LC=3$, $SC=5$ and an INSERT UNCONDITIONALLY operation starts to be performed. During the INSERT UNCONDITIONALLY operation the $ sign contained in memory location 58 which corresponds to the SC and $a$ value of 5 is inserted into the destination field at location 306. Accordingly, during $LC=3$, $SC=5$ the mask numeric digit 5 contained in the digit register section 32b is stored into the sequence counter 14 and the logic counter 12 is set to the $LC=15$.

At this point $LC=15$ and $SC=5$. The computer system now obtains a $ symbol from memory location 58 of the constant table in the memory 16 (see Table V). Accordingly, $LC=15$, $SC=5$ and the signals formed by the decoder 28 cause the address selection circuit 22a to address the location of the read only memory 22 corresponding to SC and $a=5$. Referring to Table V it will be noted that for sequence counter 14 and $a$ equal to 5 a memory address 58 is read out of the read only memory 22. The address 58 in core memory 16 contains the $ symbol.

The address 58 is read out of the read only memory 22 and is stored into the AD register 20 by the gating circuit 120c. Read/write control circuit 21 causes the core memory 16 to read out the content of address 58 and the character $ therein is stored into the MIR register 18. The sequence counter 14 is then set to $SC=14$.

The computer system is now at $LC=15$, $SC=14$ and the character $ is transferred from the MIR register 18 into the mask register 32 by the gating circuit 132. The computer system then jumps to $LC=2$, $SC=12$.

During $LC=2$, $SC=12$, $SC=13$, and $SC=14$ the character $ contained in the mask register 32 is transferred to the MIR register 18 by the gating circuit 118 and is subsequently written into the destination field at address 306; the operation of obtaining the C-address from register 26c, incrementing it, and storing it back into the C-address register 26c after addressing the core memory 16 therewith is described in detail hereinabove. Therefore, at $LC=2$, $SC=14$ the C-address word register 26c contains the incremented address 308. Also during $LC=2$, $SC=14$ the repeat digit value contained in the repeat digit register and counter 44 is 0 and the F flip-flop is in state 1. Therefore, the F flip-flop is set to 0 the mask zone digit register 32a is set to 1 and the logic counter 12 and sequence counter 14 are set to $LC=1$ and $SC=5$.

The purpose of going to $LC=1$, $SC=5$ is to insert the most significant character of the source field Z2 still contained in the source register 26 into the destination field at location 308. Stating it differently, the most significant character of the source field character, Z2, is detected and a Z2 is to be inserted in the destination field immediately following the $ symbol at memory location 308 (see Table VII).

Accordingly, the computer system starts operation at $LC=1$, $SC=5$. The C-address word, address 310, is transferred from the C-address word register 26c to the AD register 20 by the gating circuit 120a. The source character Z2 contained in the source register 36 is stored into the MIR register 18 by the gating circuit 118. Subsequently the read/write control circuit 21 causes the character Z2 contained in the MIR register 18 to be written into memory location 308 as specified by the address contained in the AD register 20. During $LC=1$, $SC=6$ the destination field address 308 contained in AD register 20 is counted up to address 310 and the gating circuit 150 sets the T flip-flop to a 1 state.

During $LC=1$, $SC=7$ the incremented destination address 310 contained in the AD register 20 is set into the C-address register 26c.

Subsequently, the computer system goes to $LC=1$ and $SC=8$, 9 and 10. During these states the last character of the source field, character Z1, is obtained from the source field address 106 and is stored into the source register 36. During $LC=1$, $SC=8$ the A-address 106 is transferred into the AD register 20 and the read/write control circuit 21 causes the core memory 16 to read out the character Z1 from address 106 and store it into the MIR register 16.

During $LC=1$, $SC=9$ the address 106 contained in the AD register 20 is counted up by 2 to address 108. During $LC=1$, $SC=10$ the address 108 contained in the AD register 20 is stored back into the A-address word register 26a and the character Z1 contained in the MIR register 18 is stored into the source register 36. The repeat digit value contained in the repeat digit register and counter 44 is zero, therefore, the logic counter 12 and a sequence counter 14 are set to $LC=0$, $SC=5$.

During $LC=0$ and $SC=5$, $SC=3$ and $SC=4$ the mask operator (75) in the mask field at location 208 is obtained and appropriately stored in the mask register 32 and the logic counter 12. Also the mask length value of 1 contained in the register 26m is counter down to 0.

Similar to that described above, the computer branches again to $LC=7$, $SC=5$ where another INSERT FLOAT operation takes place. During the execution of the INSERT FLOAT operation the computer system goes through various states of $LC=7$ and $LC=1$, during which the source character Z1 contained in the source register 36 is moved into the destination field at location 310. During $LC=7$, $SC=5$ the T flip-flop is in a "1" state, thereby indicating that significance in the field has been reached and the computer system goes to state $LC=7$, $SC=6$. The digit contained in the mask numeric digit register 32b has a value of 5 and, therefore, is not equal to 11 ($MN\neq11$). Therefore, the mask zone digit register 32a is set to 1, the logic counter 12 is set to 1 and the sequence counter 14 is set to 5.

During $LC=1$, $SC=5$, 6, and 7, the character Z1 contained in the source register 36 is stored into the destination field at address 310. The details of the operation thereof are not repeated as they are quite similar to that described hereinabove and are evident with reference to Tables IV and IX.

Subsequently, the computer system goes through states $LC=1$, $SC=8$, 9, 10 and $LC=0$ and $SC=5$ and 3. The details of the operation during these states have also been described previously and can be followed from the Table IV, therefore, are not repeated at this point in the description.

However, the operation during $LC=0$, $SC=3$ should be noted carefully. At this point the value contained in the mask length register 26*m* is 0 ($ML=0$). This indicates that all of the mask operators in the mask operator field have been executed for this particular edit command. Therefore, the edit command is to terminate. As a result, the computer system returns to the initial portion of Table IV wherein the next command is fetched and the various registers are cleared as described above.

The mask in this example is used when the programmer knows the source field is not zero, since a zero source field would cause five blanks (b̸) to be transmitted to the destination field and the sixth character of the destination field would not be effected. It would be possible to make the setting of the T flip-flop available to the programmer after the edit instruction is ended, thereby allowing him to detect such a zero condition of the source field.

With the foregoing example of operation in mind, it should be noted that a series of general mask operators of the mask field are executed in response to a single edit instruction. It should further be noted that mask operators may be completely general operators, for example, the *m* digit specifies a particular operation such as insert float. The second digit of the mask operator, digit *a*, corresponds to a particular location in a constant table in core memory 16 in which any edit symbol may be stored. In the case of an insert float the usual example is where a constant table contains a $ symbol and hence with an INSERT FLOAT mask operator the $ sign is floated until significance in the source field is detected. It should further be noted that the source register 36 forms part of the means for transferring characters from the source field to a destination field in the core memory, all characters being transferred from the memory information register 18 to the source character register 36 and back to the MIR register 18 for storage in the core memory. It will further be noted that the various editing and control circuits in the computer system including those bearing reference numerals 100 and above and the read/write control circuit 21 are responsive to an edit instruction stored in the instruction register 26 for responding to the series of mask operators contained in the mask register 32 to perform the various editing functions specified by the mask operators stored into the mask register 32.

SECOND EXAMPLE, TABLES X, XI, XII, XIII

Consider now the example shown in Table X. Table X shows an edit instruction with a field length of 2 and with the A, B, and C-addresses 100, 200 and 300. The mask field is 13 and 38. The mask operator 13 is a MOVE CHARACTER mask operator which specifies that a certain number of characters are to be moved from the source field to the destination field. With reference to Table III it will be noted that a move character (*m* value 1) designates move a character from the source field to the destination field and then repeat *a* times. Thus, the mask operator 13 in effect, designates that four characters are to be moved from the source field to the destination field.

It will now be evident that only two mask operators are needed in the example rather than the five characters required in the prior art cobal field.

The second mask operator in Table X is 38 and is an INSERT UNCONDITIONALLY operator (*m* value 3). With reference to Table III, an INSERT UNCONDITIONALLY operator (*m* value 3) designates if *a* is less than 8 ($a<8$) insert character in *a* location of constant table into destination field. However, if $a=8$, sign=+ ($S=+$) store content of $a=0$ location of constant table into destination field, but if $a=8$, sign=minus ($S=-$) store content of $a=1$ location of constant table into destination field.

Table V shows that in the location corresponding to $a=0$ the stored character is +, whereas, for $a=1$ the stored character is —. Accordingly, for the mask operator 38 *a* is equal to 8 and either a plus sign or a minus sign will be stored in a destination field depending on the sign of the source field being transferred.

Table XI shows the content of memory locations 100 through 106, 200 and 202, and 300 through 308 for the edit instruction shown in Table X. The most significant character of a source field carries the sign. Address 100 contains the most significant character of the source field and the Z̄ preceding the digit 4 indicates that the source field carries a minus sign.

Table IX gives an abbreviated description of the operation for the two mask operators in the mask field at locations 200 and 202.

An example of how the desination field would appear when printed out by conventional printers, is shown at the bottom of Table XI.

Refer now to Table XI and the sequence of operation of the computer system while executing the edit instruction shown in Table X. Initially, control signals are formed at the following output circuits of central control 100; F*e*, CL, A, B, C, M and O. This causes the edit instruction shown in Table X to be read out and stored into the instruction register 26 in the corresponding sections and causes the other registers in the system to be cleared or set to zero. The computer system then goes to $LC=0$, $SC=0$.

During $LC=0$, $SC=0$ the A, B, and C-addresses contained in the register sections 26*a*, 26*b* and 26*c*, are 100, 200, and 300, respectively, and the value contained in the mask length register 26*m* is 2. As a result during $LC=0$ and $SC=0$, 1, 2, 3 and 4, the following operations take place: the character Z̄4 is obtained from address 100 and stored in source register 36, a minus sign is stored in the sign digit register 40 by the gating circuit 140, the mask operator 13 is obtained from address 200 and stored into the mask register 32, the mask digit 1 stored in register 32*a* is stored into the logic counter 12, the value of 2 stored into the mask length register 26*m* is counted down to 1 and the A and B-addresses 100 and 200 are incremented to 102 and 202 and stored back into the corresponding registers 26a and 26*b*. Following $LC=0$, $SC=4$ the computer system branches to $LC=1$, $SC=5$.

The computer system is at state $LC=1$, $SC=5$ and a MOVE CHARACTER operation starts to take place. During $LC=1$ and $SC=5$, 6 and 7, the computer system stores the Z̄4 character contained in the source register 36 into the destination field at location 300 and the C-address is incremented from 300 to 302. The first character of the source field is being moved directly from the source field to the desination field without change, therefore, the most significant character of the source field is being transferred and the T flip-flop must be set to 1 to so indicate. Therefore, when $SC=6$ the T flip-flop is set to state 1.

During $LC=1$ and $SC=8$, 9 and 10, the character Z3 is obtained from the source field at location 102 and stored into the source character register 36 and the A-address is incremented from 102 to 104.

The details of the aforegoing operation may be followed with reference to Tables IV and XIII and the preceding example. However, the operation of the computer system during $LC=1$, $SC=10$ during this example, differs from the preceding example and should be noted. During $SC=10$ the value contained in the repeat digit register and counter 44 is 3 and is, therefore, not equal to 0 ($RD\neq0$) therefore, during $LC=1$, $SC=10$ the value contained in the repeat digit register and counter 44 is counted down by 1 and the computer system is set to $LC=1$, $SC=5$ where the preceding operation is repeated for the next source character.

The computer system is now at the next $LC=1$, $SC=5$ state, the A, B, and C-addresses are 104, 202, and 302, respectively, the value stored in the repeat digit register and counter 44 is 2, and the value stored in the mask length register 26*m* is 1. Therefore, during $LC=1$, $SC=5$ through $SC=10$ the character Z3 now stored in the source register 36 is stored into the destination field at location 302, the source character Z2 is obtained and stored in the source register 36, the A and C-addresses 104 and 302 are incremented to 106 and 304 and the value 2 in the repeat digit register and counter 44 is counted down 1 unit to $RD=1$.

The computer system is now at the subsequent $LC=1$, $SC=5$ and the A, B, and C-addresses are 106, 202 and 304, the value in the repeat digit register and counter 44 is 1 and the value in the mask length register section 26*m* is 1. Thus, during the subsequent $LC=1$ and $SC=5$ through $SC=10$ states the character Z2 now stored in the source character register 36 is stored into the destination field at location 304 the A and C-addresses 106 and 304 are incremented to 108 and 306, the value 1 stored in the repeat digit and register counter 44 is counted down 1 to 0 and the source field character Z1 stored in address 106 is obtained and stored in the source register 36.

The computer system is now at the next subsequent $LC=1$, $SC=5$ condition and the A, B, and C-addresses are 108, 202, and 306, respectively, the value contained in the repeat digit register and counter 44 is zero, and the value in the mask length register section 26*m* is 1. During $LC=1$, $SC=5$ through 10 the source character Z1 contained in the source character register 36 is stored in the destination field at location 306, the C-addresses is incremented to address 308 and the next source field character (not shown in Table XI) is obtained and stored into the source character register 36. However, since the value contained in the repeat digit register and counter 44 is now zero, the operation during $LC=1$ $SC=10$ changes. Referring to Table IV, the computer system now causes the logic counter 12 and the sequence counter 14 to be set to states $LC=0$ and $SC=5$ without counting down the repeat digit value contained in register and counter 44.

The computer system is now at $LC=0$, $LC=5$ and the A, B and C-addresses are 110, 202 and 308, the value contained in the repeat digit register and counter 44 is 0 and the value contained in the mask length register 26*m* is 1. Therefore, during the $LC=0$ and $SC=5$, $SC=3$ and 4, the next mask operator, which is 38, is obtained from the mask field at location 202 and stored into the mask character register 32, the *m* digit 3 in register 32*a* is stored into the logic counter 12, the value stored in the mask length register 26*m* is counted down 1 to 0 and the B-address is incremented from 202 to 204.

The computer system now branches to $LC=3$, $LC=5$. The A, B and C-addresses are 110, 204 and 308, the values contained in the repeat digit register and counter 44 and the mask length register 26*m* are both 0. As pointed out hereinabove, the mask operator 38 specifies an INSERT UNCONDITIONALLY operation. Also since the *a* digit of the mask operator is equal to 8 and the sign stored in the sign digit register 40 is minus ($S=-$), the content of the constant table for $a=1$, which is a character —, is to be stored into the destination field at location 308 (see Table XI and III).

Accordingly, during $LC=3$, $SC=5$, the *a* digit, a digit 8, contained in the mask numeric digit register 32*b*, is stored into the sequence counter 14. During $LC=15$, $SC=8$, the sign digit contained in register 40 is minus ($S=-$), therefore, the sequence counter 14 is set to $SC=1$.

During $LC=15$, $SC=1$, the address selection circuit 22*a* addresses the read only memory 22 corresponding to $SC=1$ (or $a=1$) causing the address 50 to be read out and stored into the AD register 20 by means of the gating 120*c*. With reference to Table V address 50 is the address in the constant table wherein the character — is stored. Subsequently, the read/write control circuit 21 causes the memory 16 to read out the — symbol contained in the constant table address 50 causing it to be stored into the MIR register 18.

During $LC=15$, $SC=14$, the — character stored in the MIR register 18 is stored into the mask character register 32 and the logic counter 12 and sequence counter 14 are set to $LC=2$, $SC=12$, respectively.

During $LC=2$ and $SC=12$, 13, 14 and 15, the — character contained in the mask character register 32 is transferred to the MIR register 18 and stored into the destination field at location 308, and the C-address 308 is incremented to 310. The details of the aforegoing operation may be followed with reference to Tables IV and XIII, making reference to the detailed description of the corresponding states described hereinabove.

Following $LC=2$, $SC=15$, the computer system goes to $LC=0$, $SC=3$. At this time the A, B and C-addresses are 110, 204 and 310 and the values contained in the repeat digit register and counter 44 and the mask length register section 26*m* are both 0. Thus, the computer system ends the edit command and again generates the control signals Fe, CL, etc., to read out the next subsequent main instruction in sequence.

It will now be evident that the logic and control system including the elements with reference numerals 100 and above are responsive to an edit instruction stored in the instruction register 26 for responding to a series of mask operators. In the case of mask operators with a repeat value in the *a* position, the computer performs the editing operation specified by the *m* digit of the mask operators and then repeats the operation the number of times designated by the *a* digit. It should also be noted that in the case of a mask operator such as 38 wherein the *a* digit of the mask operator is a pointer to the constant table in memory, the information in memory is conditionally placed in the destination field depending on the sign of the source field or the value of the source character or other conditions in the system. It is also important to note that when an edit instruction is executed, that a series of general mask operators are executed within one edit instruction.

THIRD EXAMPLE, TABLES XIV, XV

Consider now several important features not specifically described in the preceding examples. Table XIV shows a different edit instruction and a mask field. Table XV shows an example of the content of the source field, the mask field (shown in Table XIV) and the destination field. Consider the operation of the computer system while executing the mask operator shown in Table XV in response to the edit instruction shown in Table XIV. The mask operator at location 200 is 75 which specifies an insert float operation for the $ sign contained in the constant table at $a=5$. Since the most significant character in the source field is Z1 and, therefore, is a significant character (i.e. something other than 0) the $ symbol contained in the constant table at $a=5$ is stored into the destination field at address 300 and then the most significant character Z1 is stored at location 302.

Next, the mask operator 63 at address 202 is executed. This mask operator specifies an INSERT SUPPRESS operation. Referring to Table III for an INSERT SUPPRESS operator, if significance has not been previously reached ($T=0$), the computer inserts a blank (ƀ) in the next location in the destination field. The details of a similar operation were described in detail in the previous example. However, if significance has been reached, ($T=1$) as is the case in the present example, the computer is to insert the character from the *a* location in the constant table into the destination field. In the mask operator 63, the *a* value is 3 and the constant table contains a comma (,) in the corresponding location. Accordingly, the computer system obtains the comma (,) from the constant table at $a=3$ and inserts it in the destination field at 304. This operator does not require or use a source character. However, if significance in the field has not been reached, the comma will not be inserted but instead a blank would be stored. The condition detected in the system under which a character is inserted is when $T=1$. If $T=0$, the comma character would not be inserted but instead a comma would be inserted. Therefore, the INSERT SUPPRESS operator is a very powerful tool which enables the computer system to appropriately place a comma or a blank in the field being edited automatically.

The next mask characters contained in the mask field at location 204 and 206 are INSERT FLOAT mask operators 75. Since significance has been reached ($T=1$) a MOVE CHARACTER operation is preformed and the Z0 characters contained in the source field at 102 and 104 are stored into the destination field at 306 and 308.

Subsequently, the mask operator at address 208 is executed. The mask operator is an END FLOAT operator 85. With reference to Table III it will be noted that if significance has been reached, the END FLOAT operator will cause the computer system to go to the next mask operator. This operation can be followed with reference to the Table IV. At $LC=8$, $SC=5$ if $T=1$, the computer system goes to $LC=8$, $SC=6$. At $LC=8$, $SC=6$, if the mask numeric digit (ML) does not equal 11, the computer system goes to $LC=0$, $SC=5$, then to $LC=0$, $SC=3$ and $SC=4$ during which the next mask operator is obtained from the mask field at location 210. The END FOAT causes a $ or any other desired symbol from the constant table to be inserted if significance has not been reached.

Therefore, it will be understood that in the case of an END FLOAT operator, such as 85, if significance has been reached in the field as is true in this example, the mask operator 85 is skipped entirely. However, this is not the case if significance has not been reached ($T=0$) as will be explained more fully in regard to the fourth example shown in Tables XIV and XVI.

During the execution of the mask operator 10, in location 210, the character Z0 in location 10 is transferred to the destination field at location 310.

The mask operator 37 is then obtained from the mask field at location 212. The mask operator 37 specifies that the character symbol contained in $a=7$ of the constant table is to be inserted unconditionally in the destination field in location 312. With reference to Table V it will be noted that the symbol in location $a=7$ is the symbol (·). Accordingly, a decimal point is inserted into location 312 of the destination field.

Subsequently, the mask operator 11 from location 312 is executed causing the two source characters Z0 from locations 108 and 110 to be stored into the destination field at locations 314 and 316.

An example of the print out for the destination field shown in Table XV is shown at the bottom of Table XV.

FOURTH EXAMPLE, XIV, XVI

The operation of the computer system for the source field shown in Table XV should be contrasted with the operation for the source field shown in Table XVI, both of which use the same edit instruction and mask operators shown in Table XIV. During the execution of the source field shown in Table XVI the field shown in the source field locations 100 through 110 are edited and stored into the destination field in locations 300 through 316. A typical print out of the content of the destination field is shown at the bottom of Table XVI.

Refer now to Table XVI and consider the operation of the computer system while executing the mask field on the source field, both of which are shown. The mask operator 75 in address 200 causes the character Z0 in address 100 to be changed to a ƀ symbol and stored in address 300.

The mask operator 63 in address 202 is executed next. The operation caused by the mask operator 63 for the source field shown in Table XVI should be contrasted with that for the source field shown in Table XV. Table III indicates that for an INSERT SUPPRESS mask operator, such as 63, if significance has not been previously reached ($T=0$), insert a blank (ƀ). Refer to Table IV and consider the operation of the computer while inserting a blank. As described hereinabove, the $m$ digit of the mask operator is stored into the logic counter 12 causing the computer to branch to $LC=6$, $SC=5$ as described hereinabove. The most significant character of the field is not yet detected, therefore, $T=0$ and the logic counter and sequence counter are set to $LC=4$ and $SC=6$.

During $LC=4$ and $SC=6$, the mask numeric digit contained in register **32*b* is not 11, therefore, the computer goes to $LC=4$, $SC=10$. From $LC=4$, $SC=10$, the computer goes to $LC=2$, $SC=10$. During $LC=2$, $SC=10$, 11 and 12, the read only memory 22 reads out the address 60, the gating circuit 120*c* stores the address 60 into the AD register 20. The memory 16 reads out the content of address 60 of the constant table which is a blank ( ƀ) and subsequently the character ƀ is stored into the destination field at address 302. Thus, it can be seen that either a comma or a blank will be inserted in the destination field by an INSERT SUPPRESS operator, depending on the characters of the source field. The two mask operators 75 stored in locations 204 and 206 cause the characters ƀ to be stored in the destination field in the locations 304 and 306**.

The END FLOAT mask operator 85 is now obtained from locations 208 and executed. Referring to Table III it is noted that if significance has not been reached ($T=0$), the computer is to move the character from the $a$ location in the constant table to the destination field.

Refer to the details of the operation shown in Table IV. The computer system branches to $LC=8$, $SC=5$ and an END FLOAT operator. Since significance has not been reached in the source field ($T=0$) the computer system branches to $LC=3$, $SC=5$. During $LC=3$, $SC=5$, the $a$ digit contained in the mask numeric portion **32*b* of register 32 is stored into the sequence counter 14 and the logic counter is set to 15**.

During $LC=15$, $SC=5$ and 14, $LC=2$, $SC=12$, 13 and 14, the computer obtains the $ symbol from the constant table corresponding to $a=5$ and causes the symbol $ to be stored into location 308.

Therefore, it will now be understood that an END FLOAT operator can be used to conditionally cause symbols to be inserted at certain locations in the field being edited, depending on whether or not significance has been reached in the field. One of the most important uses is to cause a $ sign to stop being floated and inserted if significance has not been reached.

The mask operators 10, 37 and 11 in the mask field locations 210, 212 and 214 cause the characters Z0,·, Z0 and Z2 to be stored in the destination field locations 310, 312, 314 and 316 as described heretofore.

FIFTH EXAMPLE, TABLE XVII

Table XVII shows an example of a mask field which can be used to store symbols in addition to those stored in the constant table. One feature of the mask field shown in Table VI not heretofore described, is in connection with the last four mask operators represented by the symbols 511, D, 511, and B. The mask operator 511 represents an $m$ value of 5 and an $a$ value of 11. An $m$ value of 5 specifies an INSERT ON MINUS operation, whereas, $a$ value of 11 designates that the next subsequent character in the mask field is a literal rather than a mask operator. A literal is an actual character which does not appear in the table of constants ($a=0$ through $a=7$). Thus, D and B symbols are to be conditionally inserted. The mask operator 511 indicates that if the sign of the source field is —, then the subsequent character in the mask field is to be inserted in the field being edited, whereas, if the sign of the field is +, such character is not to be inserted.

The operation during the execution of a mask operator with *a* value of 11 can be understood with reference to Table IV. Referring to Table IV, during execution of an INSERT ON MINUS operator with an *a* value of 11, the computer branches to $LC=5$, $SC=5$. Assume the sign of the source field is —, the computer branches to $LC=3$, $SC=5$.

During $LC=3$, $SC=5$, the digit 11, previously stored in the mask numeric digit register **32*b* is stored into the sequence counter 14, and the logic counter 12** is set to $LC=15$.

The computer system is now at $LC=15$, $SC=11$ and the B-address word which is the address of the character D, is stored into the AD register 20 causing the character D to read out and stored into the MIR register 18. The computer then goes to $LC=3$, $SC=12$ where the B-address is counted up to the address of the second mask operator 511, the character D contained in the MIR register 18 is stored into the mask register 32, the mask length value contained in the mask length register **26*m* is counted down one unit. The computer system then goes to $LC=3$, $SC=13$ where the incremented B-address is stored back into the B-address register 32*b*** and the computer is set $LC=2$, $SC=12$.

During $LC=2$, $SC=12$, 13, 14 and 15, the C-address is stored into the AD register 20 and the character D contained in the mask character register 32 is stored into the destination field at the C-address. This operation is repeated for the second mask operator 511 and for the literal character B.

Thus, it should now be understood that the mask field may contain literals in the mask field and the operators may cause the literals to be inserted in the data being edited, depending on sign conditions of the source field.

It should be noted that if the sign of the source field were positive rather than negative and the *a* digit of an INSERT ON MINUS operator has a value of 11, that the computer will discard the subsequent literal because the desired condition does not exist. This operation of the computer will be understood with reference to Table IV at $LC=5$, $SC=5$. As indicated, if the sign digit equals plus ($S=+$), the computer system is set to $LC=4$ and $SC=6$. During $LC=4$, $SC=6$, 7, 8 and 9 the B-address word contained in the B-address register **26*b* is stored into the AD register 20 counted up and then stored back into the B-address register 26*b***. As a result, the computer in effect skips over the next character which is a literal in the mask field.

Table XVII also shows an example of a mask field which uses the MOVE SUPPRESS operator 22. This operator suppresses leading zeros in a manner similar to operations previously described. It also allows a move repeat.

The computer has similar logic circuitry for causing similar operations during an INSERT ON PLUS mask operator.

The operation of the computer system during execution of a CONTROL operator should be noted. A CONTROL operator has an *m* value of 9. A CONTROL operator causes the computer system to branch to $LC=9$, $SC=5$. The operations of the control operator with value $LC=9$ can be understood with reference to $LC=9$, $SC=5$ shown in Table IV. As indicated, if the mask numeric value, which is the *a* digit, is 0, the T flip-flop is set to 0, whereas, if the mask numeric is a 1, the T flip-flop is set to 1. In this manner, the T flip-flop can be set to indicate that significance has, or has not, been reached in the source field as desired by the programmer.

Although characters are used by way of example in the specification to denote 8 bits of information or two 4-bit digits the characters handled by a computer in accordance with the present invention is not limited thereto and the characters may be any number of bits. Neither does a digit need to be restricted to 4 bits but could comprise other numbers of bits.

What has been described is considered to be only one illustrative embodiment of the present invention. Accordingly, it is to be understood that various and numerous other arrangements may be designed by one skilled in the art without departing from the spirit and scope of the invention. Other types of mask operators (e.g. to skip over source characters, or to allow "check protection" characters to be substituted for b̸ can be treated in a completely analogous fashion.

*TABLE I*

3-address edit instruction format

↓

| OP CODE | FIELD LENGTH | A ADDRESS | B ADDRESS | C ADDRESS |
|---|---|---|---|---|
| Edit | No. of ch. in mask field. | Beginning of source field. | Beginning of mask field. | Beginning of destination field. |

*TABLE II*

Mask operator format (1 character long)

↓

| m | a |
|---|---|

↑ Repeat or control meaning or pointer to constant table (a)

↑ General edit operator code (m)

*TABLE III*

MASK OPERATORS IN WHICH "a" DIGIT HAS A REPEAT MEANING

| MASK OPERATOR "m" VALUE | TITLE OF MASK OPERATOR | DESCRIPTION |
|---|---|---|
| 1 | MOVE CHARACTER | Move a character from the source field to the destination field, set T=1 to indicate significance AND THEN repeat "a" times |
| 2 | MOVE SUPPRESS | If significance is reached in the source field (T=1) or the source character is not "0" perform a MOVE CHARACTER operation AND THEN repeat "a" times.<br>If significance has not been reached in the source field (T=0) and the source character is "0", replace source character with a blank in destination field AND THEN repeat the MOVE SUPPRESS operation "a" times. |

TABLE III—Continued

| | | |
|---|---|---|
| MASK OPERATORS IN WHICH "a" DIGIT IS A POINTER TO CONSTANT TABLE IN MEMORY. (SEE *TABLE X*) | | |
| 3 | INSERT UNCONDITIONALLY | If a <8 insert character in "a" location of constant table into destination field. If a=8, sign=+(S=+) store content of a=0 location of constant table into destination field. If a=8, sign=−(S=−) store content of a=1 location of constant table into destination field. If a=11, treat the next mask character as a literal and store it into destination field. |
| 4 | INSERT ON PLUS | If sign = + (S=+) move character from the "a" location of constant table to destination field. If sign = − (S=−) insert a blank (ƀ) in destination field. |
| 5 | INSERT ON MINUS | If sign of character = − (S=−) move character from the "a" location of constant table to destination field. If sign of character = + (S=+) insert a blank (ƀ) in destination field. |
| 6 | INSERT SUPPRESS | If significance has not been previously reached (T=0) insert a blank (ƀ). If significance has been reached (T=1) insert the character from the "a" location in the constant table into the destination field. |
| 7 | INSERT FLOAT | If significance has not been reached (T=0) and the source character is "0" (SD=0) insert a blank (ƀ) in the destination field. If significance has not been previously reached (T=0) but the source character is not 0 (SD≠0) insert the character in the "a" location of the constant table into the destination field AND THEN perform a MOVE CHARACTER operation. If significance has been reached (T=1) perform a MOVE CHARACTER operation. |
| 8 | END FLOAT | If significance has not been reached (T=0) move the character from the "a" location in the constant table to the destination field. If significance has been reached (T=1) go to the next mask operator. |
| MASK OPERATOR IN WHICH "a" DIGIT HAS A CONTROL MEANING | | |
| 9 | CONTROL | If a=0 set T=0 to mark that significance has not been reached in source field. If a=1 set T=1 to mark that significance has been reached in source field. |

*TABLE IV*

FETCH & CLEAR

OP DIGIT, MASK LENGTH, A, B AND C ADDRESS MEMORY WORDS ARE LOADED FROM PREVIOUS FETCH UNDER CONTROL OF Fe, O, M, A, B, C. ALL OTHER REGISTERS ARE CLEARED (CL).

START EDIT (S.E.)

LC=0
SC=0
SET A ADDRESS WORD INTO AD REGISTER.
READ MEMORY TO MIR. CONT SC+1.
SC=1
STORE SIGN IN SIGN DIGIT REGISTER.
COUNT AD REGISTER+2.
COUNT SC+1.
SC=2
SET MIR INTO SOURCE REGISTER.
SET AD REGISTER INTO A ADDRESS WORD REGISTER.
SET B ADDRESS WORD INTO AD REGISTER.
READ MEMORY TO MIR.
COUNT SC+1.
SC=3
IF MASK LENGTH=0 (ML=0), END COMMAND.
COUNT MASK LENGTH −1.
SET MIR INTO MASK REGISTER.
COUNT AD REGISTER+2.
COUNT SC=1.
SC=4
SET AD REGISTER INTO B ADDRESS WORD REGISTER.
SET MASK ZONE DIGIT INTO LC.
SET MASK NUMERIC DIGIT INTO REPEAT REG. DIGIT & CTR. IF MASK ZONE (MZ) <3.
COUNT SC+1.
(AT THIS POINT LC CAUSES BRANCH).
SC=5
SET B ADDRESS WORD INTO AD REGISTER.
READ MEMORY TO MIR. SET SC=3.

MOVE CHARACTER

LC=1
SC=5
SET C ADDRESS WORD INTO AD REGISTER.
SET SOURCE CHARACTER INTO MIR.
WRITE MEMORY FROM MIR.
COUNT SC+1.
SC=6
COUNT AD REGISTER+2.
SET T=1. COUNT SC+1.
SC=7
SET AD REGISTER INTO C ADDRESS WORD REGISTER.
COUNT SC+1.
SC=8
SET A ADDRESS WORD INTO AD REGISTER.
READ MEMORY TO MIR.
COUNT SC+1.
SC=9
COUNT AD REGISTER+2. COUNT SC+1.
SC=10
SET AD REGISTER INTO A ADDRESS WORD REGISTER.
SET MIR INTO SOURCE REGISTER.
IF REPEAT DIGIT≠0 (RD≠0): COUNT REPEAT DIGIT−1, SET SC=5.
IF REPEAT DIGIT=0 (RD=0): SET LC=0 AND SC=5.

MOVE SUPPRESS

LC=2
SC=5
IF T=1 OR SOURCE NUMERIC DIGIT≠0 (SD≠0), SET LC=1.
IF T=0 AND SOURCE NUMERIC DIGIT=0 (SD=0), COUNT SC+1.
SC=6
SET A ADDRESS WORD INTO AD REGISTER.
READ MEMORY TO MIR. COUNT SC+1.
SC=7
SET MIR INTO SOURCE REGISTER.
COUNT AD REGISTER+2.
COUNT SC+1.
SC=8
SET AD REGISTER INTO A ADDRESS WORD REGISTER.
COUNT SC+1.
SC=9
SET READ/ONLY MEMORY OUTPUT (ƀ) INTO MASK REGISTER.
SET SC=12.
SC=10
SET READ/ONLY MEMORY OUTPUT (60) INTO AD REGISTER.
READ MEMORY TO MIR. COUNT SC+1.
SC=11
SET MIR INTO MASK REGISTER. COUNT SC+1.
SC=12
SET C ADDRESS WORD INTO AD REGISTER.
SET MASK REGISTER INTO MIR.
WRITE MEMORY FROM MIR. COUNT SC+1.
SC=13
COUNT AD REGISTER+2. COUNT SC+1.
SC=14
SET AD REGISTER INTO C ADDRESS WORD REGISTER·
IF REPEAT DIGIT≠0 (RD≠0): COUNT REPEAT DIGIT−1, SET SC=5.
IF REPEAT DIGIT=0 AND F=1: SET F=0, MASK ZONE REGISTER=1, LC=1 AND SET SC=5.
IF REPEAT DIGIT=0 (RD=0) AND F=0, COUNT SC+1.
SC=15

SET B ADDRESS WORD INTO AD REGISTER.
READ MEMORY TO MIR. SET LC=0 AND SET SC=3.

INSERT UNCONDITIONALLY

LC=3
SC=5
SET MASK NUMERIC INTO SC.
SET LC=15.
LC=15
SC=0–7
SET R/O MEMORY OUTPUT INTO AD REGISTER. (SEE *TABLE V*).
READ MEMORY TO MIR. SET SC=14.
SC=14
SET MIR INTO MASK REGISTER. SET LC=2, SET SC=12.
SC=8
IF SIGN DIGIT=+(S=+), SET SC=0.
IF SIGN DIGIT=−(S=−), SET SC=1.
SC=9
IF SIGN DIGIT=+(S=+), SET LC=2.
IF SIGN DIGIT=−(S=−), SET SC=1.
SC=10
IF SIGN DIGIT=+(S=+), SET SC=0.
IF SIGN DIGIT=−(S=−), SET LC=2 AND SC=9.
SC=11
SET B ADDRESS WORD INTO AD REGISTER.
READ MEMORY TO MIR. COUNT SC+1.
SC=12
COUNT AD REGISTER+2.
SET MIR INTO MASK REGISTER.
COUNT MASK LENGTH−1.
COUNT SC+1.
SC=13
SET AD REGISTER INTO B ADDRESS WORD REGISTER.
SET LC=2 AND SC=12.

INSERT ON +

LC=4
SC=5
IF SIGN DIGIT=+(S=+), SET LC=3.
IF SIGN DIGIT=−(S=−), COUNT SC+1.
SC=6
IF MASK NUMERIC≠11 (MN≠11) OR MASK LENGTH=0 (ML=0), SET SC=10.
IF MASK NUMERIC=11 (MN=11) AND MASK LENGTH≠0 (ML≠0), COUNT SC+1.
SC=7
SET MASK NUMERIC=0.
COUNT MASK LENGTH−1.
SET B ADDRESS WORD INTO AD REGISTER.
COUNT SC+1.
SC=8
COUNT AD REGISTER+2.
COUNT SC+1.
SC=9
SET AD REGISTER INTO B ADDRESS WORD REGISTER.
SET SC=6.
SC=10
SET LC=2.
LC=5
SC=5
IF SIGN DIGIT=−(S=−), SET LC=3.
IF SIGN DIGIT=+(S=+), SET LC=4 AND COUNT SC+1.

INSERT SUPPRESS

LC=6
SC=5
IF T=1, SET LC=3.
IF T=0, SET LC=4 AND COUNT SC+1.

IF MASK LENGTH≠0 (ML≠0), COUNT SC+1.
SC=9
SET A ADDRESS WORD INTO AD REGISTER.
READ MEMORY TO MIR. COUNT SC+1.
SC=10
COUNT AD REGISTER+2. COUNT SC+1.
SC=11
SET AD REGISTER INTO A ADDRESS WORD REGISTER.
SET LC=4 AND SC=6. SET MIR INTO SOURCE REGISTER.
SC=12
SET MASK ZONE=1. COUNT MASK LENGTH−1.
SET B ADDRESS WORD INTO AD REGISTER. COUNT SC+1.
SC=13
COUNT AD REGISTER+2.
COUNT SC+1.
SC=14
SET AD REGISTER INTO B ADDRESS REGISTER.
SET SC=5 AND LC=1.

END FLOAT

LC=8
SC=5
IF T=0, SET LC=3.
IF T=1, COUNT SC+1.
SC=6
IF MASK NUMERIC≠11 (MN≠11), OR MASK LENGTH=0 (ML=0): SET LC=0 AND SC=5.
IF MASK NUMERIC=11 (MN=11) AND MASK LENGTH≠0 (ML≠0), SET SC=8.
SC=8
SET B ADDRESS WORD INTO AD REGISTER.
COUNT MASK LENGTH−1.
COUNT SC+1.
SC=9
COUNT AD REGISTER+2.
COUNT SC+1.
SC=10
SET AD REGISTER INTO B ADDRESS WORD REGISTER.
LC=9, CONTROL
SC=5
IF MASK NUMERIC=0 (MN=0), SET T=0.
IF MASK NUMERIC=1 (MN=1), SET T=1.
SET LC=0 AND SC=5.

TABLE V

| SC & a | Core Memory Address | Stored Character |
|---|---|---|
| Value: | | |
| 0 | 48 | + |
| 1 | 50 | − |
| 2 | 52 | * |
| 3 | 54 | , |
| 4 | 56 | / |
| 5 | 58 | $ |
| 6 | 60 | ƀ |
| 7 | 62 | . |

*TABLE VI*

| | OP | FIELD LENGTH | A ADDRESS | B ADDRESS | C ADDRESS |
|---|---|---|---|---|---|
| INSTRUCTION | Edit | 5 | 100 | 200 | 300 |
| Present Mask Field | | 75 64 75 75 75 | | | |
| COBOL FIELD (PRIOR ART) | | $ $, $ $ $ | | | |

*TABLE VII*

CONTENT OF MEMORY

| Source Field | | Mask Field | | Destination Field | |
|---|---|---|---|---|---|
| A ADDRESS | INFO | B ADDRESS | INFO | C ADDRESS | INFO |
| 100 | Z0 | 200 | 75 | 300 | ƀ |
| 102 | Z0 | 202 | 64 | 302 | ƀ |
| 104 | Z2 | 204 | 75 | 304 | ƀ |
| 106 | Z1 | 206 | 75 | 306 | $ |
| | | 208 | 75 | 308 | Z2 |
| | | | | 310 | Z1 |

EXAMPLE OF PRINT OUT "$21"

INSERT FLOAT

LC=7
SC=5
IF T=1, COUNT SC+1.
IF T=0, SET SC=7.
SC=6
IF MASK NUMERIC≠11 (MN≠11), OR MASK LENGTH=0 (ML=0): SET MASK ZONE=1, SET LC=1 AND SC=5.
IF MASK NUMERIC=11 (MN=11) AND MASK LENGTH≠0 (ML≠0), SET SC=12.
SC=7
IF SOURCE DIGIT≠0 (SD≠0): SET F=1, SC=5 AND LC=3.
IF SOURCE DIGIT=0 (SD=0), COUNT SC+1.
SC=8
IF MASK LENGTH=0 (ML=0), SET LC=4 AND SC=6.

*TABLE VIII*

| Mask Field | |
|---|---|
| B-ADDRESS | INFO |
| 200 | 75 Replace Z0 in 100 with ƀ and store in 300. |
| 202 | 64 Insert ƀ in 302. |
| 200 | 75 Replace Z0 in 102 with ƀ and store in 304. |
| 206 | 75 Insert $ in 306 and move Z2 from 104 to 308. |
| 208 | 75 Move Z1 from 106 to 310. |

*TABLE IX*

Fetch & clear:
    Fe, CL, A, B, C
    M, O (A=100, B=200, C=300, ML=5)

↓

Obtain mask op. 75:
    LC=0, SC=0
    LC=0, SC=1 (S=+)
    LC=0, SC=2 (A=102)
    LC=0, SC=3 (ML=4)
    LC=0, SC=4 (B=202)

↓

MASK 75

Replace Z0 in 100 with b̸ in 300:
    LC=7, SC=5
    LC=7, SC=7
    LC=7, SC=8
    LC=7, SC=9
    LC=7, SC=10
    LC=7, SC=11 (A=104)
    LC=4, SC=6
    LC=4, SC=10
    LC=2, SC=9
    LC=2, SC=12
    LC=2, SC=13
    LC=2, SC=14 (C=302)
Obtain mask op. 64:
    LC=2, SC=15
    LC=0, SC=3 (ML=3)
    LC=0, SC=4 (B=204)

(A=104, B=204, C=302, ML=3)

↓

MASK 64

Insert b̸ in 302:
    LC=6, SC=5
    LC=4, SC=6
    LC=4, SC=10
    LC=2, SC=9
    LC=2, SC=12
    LC=2, SC=13
    LC=2, SC=14 (C=304)
Obtain mask op. 75:
    LC=2, SC=15
    LC=0, SC=3 (ML=2)
    LC=0, SC=4 (B=206)

(A=104, B=206, C=304, ML=2)

↓

MASK 75

Replace Z0 in 102 with b̸ in 304:
    LC=7, SC=5

LC=7, SC=7
    LC=7, SC=8
    LC=7, SC=9
    LC=7, SC=10
    LC=7, SC=11 (A=106)
    LC=4, SC=6
    LC=4, SC=10
    LC=2, SC=9
    LC=2, SC=12
    LC=2, SC=13
    LC=2, SC=14 (C=306)
Obtain mask op. 75:
    LC=2, SC=15
    LC=0, SC=3 (ML=1)
    LC=0, SC=4 (B=208)

(A=106, B=208, C=306, ML=1)

↓

MASK 75

Insert $ in 306:
    LC=7, SC=5
    LC=7, SC=7 (set F=1)
    LC=3, SC=5
    LC=15, SC=5
    LC=15, SC=14
    LC=2, SC=12
    LC=2, SC=13
    LC=2, SC=14 (C=308, set F=0)

↓

Move Z2 into 308:
    LC=1, SC=5
    LC=1, SC=6 (set T=1)
    LC=1, SC=7 (C=310)
Obtain Z1:
    LC=1, SC=8
    LC=1, SC=9
    LC=1, SC=10 (A=108)
Obtain mask op. 75:
    LC=0, SC=5
    LC=0, SC=3 (ML=0)
    LC=0, SC=4 (B=210)

(A=108, B=210, C=310, ML=0)

↓

MASK 75

Move Z1 into 310:
    LC=7, SC=5
    LC=7, SC=6
    LC=1, SC=5
    LC=1, SC=6
    LC=1, SC=7 (C=312)
    LC=1, SC=8
    LC=1, SC=9
    LC=1, SC=10
    LC=0, SC=5
    LC=0, SC=3
    Fe, CL, etc.

*TABLE X*

| | OP. | FIELD LENGTH | A ADDRESS | B ADDRESS | C ADDRESS |
|---|---|---|---|---|---|
| INSTRUCTION | EDIT | 2 | 100 | 200 | 300 |
| Present Mask Field | | 13 38 | | | |
| COBOL FIELD (PRIOR ART) 9 9 9 9 + | | | | | |

*TABLE XI*

| CONTENT OF MEMORY | | | | | |
|---|---|---|---|---|---|
| Source Field | | Mask Field | | Destination Field | |
| A-ADDRESS | INFO | B-ADDRESS | INFO | C-ADDRESS | INFO |
| 100 | Z4 | 200 | 13 | 300 | Z4 |
| 102 | Z3 | 202 | 38 | 302 | Z3 |
| 104 | Z2 | | | 304 | Z2 |
| 106 | Z1 | | | 306 | Z1 |
| | | | | 308 | Z- |

EXAMPLE OF PRINT OUT "4321-"

*TABLE XII*

| Mask Field | |
|---|---|
| B-ADDRESS | INFO |
| 200 | 13 Move the three characters Z̄4,Z3,Z2,Z1 from 100 through 106 to 300 through 306. |
| 202 | 38 Insert Z- in 308. |

*TABLE XIII*

Fetch & clear:
Fe, CL, A, B, C
M, O (A=100, B=200, C=300, ML=2)

↓

Obtain ch. Z̄4 and mask op. 13:
LC=0, SC=0
LC=0, SC=1
LC=0, SC=2 (A=102)
LC=0, SC=3 (ML=1)
LC=0, SC=4 (B=202)

(A=102, B=202, C=300, RD=3, ML=1)

↓

MASK 13

Store Z̄4 into 300:
LC=1, SC=5
LC=1, SC=6 (SET T=1)
LC=1, SC=7 (C=302)
LC=1, SC=8
Obtain Z3:
LC=1, SC9
LC=1, SC=10 (A=104, RD=2)

(A=104, B=202, C=302, RD=2, ML=1)

↓

Store Z3 into 302:
LC=1, SC=5
LC=1, SC=6
LC=1, SC=7 (C=304)
LC=1, SC=8
Obtain Z2:
LC=1, SC=9
LC=1, SC=10 (A=106, RD=1)

(A=106, B=202, C=304, RD=1, ML=1)

↓

Store Z2 into 304:
LC=1, SC=5
LC=1, SC=6
LC=1, SC=7 (C=306)
LC=1, SC=8
Obtain Z1:
LC=1, SC=9
LC=1, SC=10 (A=108, RD=0)

(A=108, B=202, C=306, RD=0, ML=1)

↓

Store Z1 in 306 obtain source character from 108:
LC=1, SC=5
LC=1, SC=6
LC=1, SC=7 (C=308)
LC=1, SC=8
LC=1, SC=9
LC=1, SC=10 (A=110)

(A=110, B=202, C=308, RD=0, ML=1)

↓

Obtain mask 38:
LC=0, SC=5
LC=0, SC=3 (ML=0)
LC=0, SC=4 (B=204)

(A=110, B=204, C=308, RD=0, ML=0)

Store Z— into 308:
LC=3, SC=5
LC=15, SC=8
LC=15, SC=1
LC=15, SC=14
LC=2, SC=12
LC=2, SC=13
LC=2, SC=14 (C=310)
LC=2, SC=15

(A=110, B=204, C=310, RD=0, ML=0)

LC=0, SC=3

Fe, CL, etc.

*TABLE XIV*

| | OP. | FIELD LENGTH | A ADDRESS | B ADDRESS | C ADDRESS |
|---|---|---|---|---|---|
| INSTRUCTION | EDIT | 7 | 100 | 200 | 300 |
| PRESENT MASK FIELD | 75 63 75 75 85 10 37 11 | | | | |

*TABLE XV*

CONTENT OF MEMORY

| Source Field | | Mask Field | | Destination Field | |
|---|---|---|---|---|---|
| A-ADDRESS | INFO | B-ADDRESS | INFO | C-ADDRESS | INFO |
| 100 | Z1 | 200 | 75 | 300 | $ |
| 102 | Z0 | 202 | 63 | 302 | Z1 |
| 104 | Z0 | 204 | 75 | 304 | , |
| 106 | Z0 | 206 | 75 | 306 | Z0 |
| 108 | Z0 | 208 | 85 | 308 | Z0 |
| 110 | Z0 | 210 | 10 | 310 | Z0 |
| | | 212 | 37 | 312 | . |
| | | 214 | 11 | 314 | Z0 |
| | | | | 316 | Z0 |

EXAMPLE OF PRINT OUT "$1,000.00"

*TABLE XVI*

CONTENT OF MEMORY

| Source Field | | Mask Field | | Destination Field | |
|---|---|---|---|---|---|
| A-ADDRESS | INFO | B-ADDRESS | INFO | C-ADDRESS | INFO |
| 100 | Z0 | 200 | 75 | 300 | ƀ |
| 102 | Z0 | 202 | 63 | 302 | ƀ |
| 104 | Z0 | 204 | 75 | 204 | ƀ |
| 106 | Z0 | 206 | 75 | 306 | ƀ |
| 108 | Z0 | 208 | 85 | 308 | $ |
| 110 | Z2 | 210 | 10 | 310 | Z0 |
| | | 212 | 37 | 312 | . |
| | | 214 | 11 | 314 | Z0 |
| | | | | 316 | Z2 |

EXAMPLE OF PRINT OUT "$0.02"

*TABLE XVII*

MASK FIELD 22 37 11 511 D 511 B
EXAMPLE OF PRINT OUT "99.99DB"

We claim:

1. In a computer having editing apparatus the combination comprising, register means for storing program instructions, register means for storing a series of edit operators, memory means, and editing means responsive to an instruction stored in said instruction register means for responding to a series of edit operators stored in said edit operator register means for transferring a source field of data in the memory means to a destination field in the memory means editing the source field of data as it is transferred as specified by the stored edit operators.

2. In a computer having apparatus for editing data the combination comprising, register means for storing program instructions including an edit instruction for controlling the computer operation, register means for storing a series of edit operators at least some of which designate editing operations to be performed on a source field of data, memory means for storing a source field of data to be edited and having storage location for storing a destination field of data, and editing means responsive to a stored edit instruction for responding to the series of stored edit operators for transferring the source field of data in the memory means to the destination field in the memory means editing the source field of data as it is transferred as specified by the stored edit operators.

3. In a computer having editing apparatus the combination comprising memory means for storing data to be edited, and a series of edit operators and program instructions, first and second register means for storing said program instructions and edit operators respectively, means for obtaining from said memory means the program instructions and edit operators and for storing same in their respective register means and editing means responsive to an instruction specifying an edit operation for responding to a series of edit operators stored in the corresponding register means for obtaining the data to be edited from said memory means and for transferring same to a destination field in the memory means editing the data as specified by such edit operators.

4. In a computer having editing apparatus the combination comprising memory means having addressable memory locations; data to be edited, a program of instructions, a series of edit operators, and a table of symbols to be placed in the data to be edited being stored in said memory locations, at least some of the edit operators comprising an identifier corresponding to a memory location containing a symbol in said table; first and second register means for storing said instructions and edit operators respectively; means for obtaining from said memory means the instructions and edit operators and for storing same in their respective register means; and editing means responsive to an instruction specifying an edit operation for responding to a series of edit operators stored in the corresponding register means for obtaining the data to be edited from said memory means and for transferring same to a destination field in the memory means editing the data as specified by such edit operators, said editing means responding to an edit operator having an identifier for selectively obtaining a symbol from a memory location in the table corresponding to such identifier and for selectively storing such constant in the edited data in such destination field.

5. In a computer having means for editing data the combination comprising, register means for storing a series of program instructions including an edit instruction for controlling the computer operation; register means for storing a series of edit operators at least some of which comprise an operator and a symbol identifier; memory means; a table of symbols for editing stored in memory locations corresponding to such symbol identifier, a destination field for edited data and a source field having data to be edited stored in said memory means; a source register for temporarily storing data being transferred between a source field and a destination field; means responsive to a stored edit instruction for transferring data from the source field to the destination field in said memory means through said source character register under control of stored edit operators; and means controlled by a stored edit operator for selectively obtaining a stored symbol from a memory location in the table contained in said memory means corresponding to a stored symbol identifier in such edit operator and for storing such symbol in a destination field.

6. In a computer having means for editing data the combination comprising, register means for storing a series of program instructions including an edit instruction for controlling the computer operation, register means for storing a series of edit operators at least some of which comprise a symbol identifier and an operator specifying that a symbol is to be inserted in data being edited when a predetermined condition of the data is detected, memory means, a table of symbols stored in memory locations corresponding to such symbol identifier, a destination field for edited data and a source field having data to be edited in said memory means, a source register for temporarily storing data being transferred between the source field and the destination field, means responsive to a stored edit instruction for transferring data from the source field to the destination field in said memory means through said source character register under control of stored edit operators and including means controlled by a stored edit operator for selectively obtaining a stored symbol from a memory location in the table contained in said memory corresponding to a stored symbol identifier in such edit operator and for selectively storing such symbol in a destination field when the data stored in said source register satisfies the predetermined condition.

7. In a computer having apparatus for editing data the combination comprising, first and second register means for storing instructions and a series of edit operators respectively, at least some of the edit operators comprising first or second edit operators having a symbol identifier and an operator specifying that a symbol is to be selectively placed in the data being edited, memory means, a table of symbols stored in memory locations corresponding to such table identifier, a source field of characters and a destination field in said memory means, editing means responsive to a stored edit instruction for responding to a series of edit operators for serially transferring characters from the source field to the destination field in said memory means editing the source characters as specified by such edit operators, means for monitoring the source characters being transferred and for providing an indication of the first non zero source character in the field, said editing means comprising means responsive to said first and second edit operators for selectively obtaining the symbol from the symbol table corresponding to the symbol identifier in the respective edit operator and for placing the symbol in the destination field for the first edit operator when a non zero source character has been detected and for placing the symbol in the destination field for the second edit operator when a non source character has not been detected.

8. In a computer having apparatus for editing the combination comprising memory means for storing a program of instructions which includes edit instructions, a series of edit operators having an operator code digit and a second digit, and a source field of data characters to be edited, said memory means having storage locations corresponding to the second digit of certain edit operators for storing a table of symbols to be placed in the data being edited, an instruction register, instruction register means, edit operator register means having first and second sections for simultaneously storing both digits of an edit operator, a source character register, means for obtaining the instructions and edit operators and source characters from said memory means for storing same in the respective registers, the last named means being operative for reading out a series of said edit operators for one edit instruction stored in the instruction register means, means for monitoring the source characters being stored in the source character register and for detecting preselected conditions in the source character field, storage means for storing signals indicative of conditions detected by the last named means, means for selectively obtaining a symbol from the location of the table in said memory means corresponding to the second digit of said certain edit operator and means controlled by the edit operator stored in said edit operator register means and said storage means for storing in a destination field in said memory means one or the other or both the source character stored in said source character register means and said symbol from said memory means as specified by such edit operator and the storage content of said storage means.

9. In a computer having apparatus for editing data the combination comprising, register means for storing a series of program instructions including an edit instruction for controlling the computer operation, register means for storing a series of edit operators comprising a general operator and a symbol identifier, memory means for storing a table of symbols in memory locations related to such symbol identifier and having destination fields for storing edited data and source fields for storing source data to be edited, means responsive to an edit instruction stored in said instruction register means for responding to stored edit operators for thereby transferring data from a source field in said memory means to a destination field in said memory means in accordance with said edit operators, and means responsive to an edit operator for obtaining a symbol from a location in the table in said memory means corresponding to a symbol identifier of such edit operator and for placing such symbol in said destination field in the memory means.

10. In a digital computer for editing data the combination comprising register means for storing a series of instructions for controlling the computer operation including an edit instruction, register means for storing a series of edit operators at least some of which comprise a move operator and a repeat symbol, memory means having a source field for storing a series of data units to be edited and a destination field for storing edited data, means responsive to a stored edit instruction for editing said source data as specified by stored edit operators and comprising means for transferring the number of data units from a source field to a destination field of said memory means specified by the repeat symbol corresponding to a move operator.

11. In a computer having apparatus for editing data the combination comprising, first and second register means for storing instructions and a series of edit operators respectively, at least some of the edit operators comprising a symbol identifier and an operator specifying that a symbol is to be placed in the data being edited when a non zero character in the data field is detected, memory means, a table of symbols stored in memory locations corresponding to such table identifier, a source field of characters and a destination field in said memory means, editing means responsive to a stored edit instruction for responding to a series of edit operators for serially transferring data characters from the source field to the destination field in said memory means editing the source characters as specified by such edit operators, means for monitoring the source characters being transferred and for providing an indication upon detecting the first non zero character in the field, said editing means comprising means responsive to an edit operator having a symbol identifier for selectively obtaining a symbol from the location in the symbol table corresponding to such symbol identifier and for placing same in the destination field when such first non zero character is detected.

12. In a computer system as defined in claim 11 wherein said edit operators comprise a second mask operator comprising a symbol identifier, said editing means comprising means responsive to said second edit operator and the absence of the detection of a non zero character for selectively obtaining the constant from the table location corresponding to the symbol identifier thereof and for placing same in the destination field.

13. In a computer having apparatus for editing data the combination comprising, first and second register means for storing instructions and a series of edit operators respectively, at least some of the edit operators comprising a symbol identifier and an operator specifying a symbol is to be placed in the data being edited when a predetermined condition of the data exists, memory means, a table of symbols stored in memory locations corresponding to such table identifier, a source field of data and a destination field in said memory means, editing means responsive to a stored edit instruction for responding to a series of edit operators for serially transferring data characters from the source field to the destination field in said memory means editing the source data as specified by such edit operators, means for monitoring the source data being transferred and for providing an indication upon detecting a predetremined condition of the source data, said editing means comprising means responsive to an edit operator having a symbol identifier for selectively obtaining a symbol from the location in the symbol table corresponding to such symbol identifier and for placing same in the destination field when said predetermined condition is indicated by said indicating means.

14. In a digital computer for editing data the combination comprising register means for storing a series of instructions for controlling the operation of the computer including an edit instruction, means for storing a series of edit operators for controlling edit operations at least some of which comprise a move operator and a repeat symbol, the latter storing means comprising a counter for storing and counting relative to the repeat symbol, memory means having a source field for storing a series of units of data to be edited and a destination field for storing edited data, and means responsive to a stored edit instruction for editing said source data as specified by stored edit operators and comprising means responsive to a stored move operator for transferring said data unit from a source field to a destination field, said counter counting the data units being transferred, said transferring means being operable for repeating the transfer of a data unit terminating such repeat when the counter reaches a value indicating the number of data units corresponding to the value of the stored repeat symbol are moved.

15. In a computer having apparatus for editing the combination comprising memory means for storing a program of instructions which includes edit instructions, a series of edit operators having an operator code digit and a second digit, and a source field of data characters to be edited, the edit instructions identifying the beginning of a source field to be edited, the beginning of a destination field for edited data and the number of edit operators for the edit instruction, said memory means having storage locations corresponding to the second digit of certain edit operators for storing a table of symbols to be placed in the data being edited, instruction register means, edit operator register means having first and second sections for simultaneously storing both digits of an edit operator, a source character register, means for obtaining the instructions and edit operators and source characters from said memory means and for storing same in the respective registers, the last named means being operative for reading out the number of said edit operators for one edit instruction specified by such edit instruction stored in the instruction register means and operative for obtaining source data beginning with the location indicated by the stored edit instruction, means for monitoring the source characters being stored in the source character register, and for detecting preselected conditions in the source character field, storage means for storing signals indicative of conditions detected by the last named means, means for selectively obtaining a symbol from the location of the table in said memory means corresponding to the second digit of said certain edit operator and means for storing in a destination field in said memory means which begins with the location specified by the stored edit instruction one or the other or both the source character stored in said source character register means and said symbol from said memory means in response to a stored edit operator and the storage content of said storage means.

16. In a computer having apparatus for editing the combination comprising memory means for storing a program of instructions which includes edit instructions, a series of edit operators having an operator code digit and a second digit, and a source field of data characters to be edited, said memory means having storage locations corresponding to the second digit of certain edit operators for storing a table of symbols to be placed in the data being edited, an instruction register, edit operator register means having first and second sections for simultaneously storing both digits of an edit operator, a source character register, means for obtaining the instructions and edit operators and source characters from said memory means and for storing same in the respective registers, the last named means being operative for reading out a series of said edit operators for one edit instruction stored in the instruction register means, means for monitoring the source characters being stored in the source character register and for detecting preselected conditions in the source character field, storage means for storing signals indicative of conditions detected by the last named means, means for selectively obtaining a symbol from the location of the table in said memory means corresponding to the second digit of said certain edit operator and means controlled by the edit operator stored in said edit operator registor means and said storage means for storing in a destination field in said memory means one or the other or both the source character stored in said source character register means and said symbol from said memory means depending on said edit operator and the storage content of said storage means.

17. In a computer having editing apparatus the combination comprising memory means for storing data to be edited and a series of edit operators comprising at least one general edit operator without specific editing symbols therein and for storing program instructions including an edit instruction specifying the number of edit operators associated with such instruction and the beginning of a source field and a destination field in said memory means, first and second register means for storing said program instructions and edit operators respectively, means for obtaining from said memory means the program instructions and edit operators and for storing same in their respective register means, the last named means being operative for obtaining and storing one by one the number of edit operators specified by an edit instruction stored in the corresponding register means, and editing means responsive to an instruction specifying an edit operation for responding to a series of edit operators including the general edit operators stored in the corresponding register means for obtaining the data to be edited from the source field in said memory means beginning with the location specified by the stored edit instruction and for transferring same to a destination field in the memory means which begins with the memory location specified by such stored edit instruction editing the data as specified by such edit operators.

18. In a computer having editing apparatus the combination comprising, memory means, register means for storing program instructions including an edit instruction which identifies source and destination fields for data in said memory means, register means for storing a series of edit operators specifying editing operations, and editing means responsive to an edit instruction stored in said instruction register means for responding to said edit operators stored in said edit operator register means for transferring data in the memory means from the identified source field to the identified destination field in the memory means editing the source field of data as it is transferred as specified by the stored edit operators.

19. In a computer having editing apparatus the combination comprising, memory means, register means for storing program instructions including an edit instruction which identifies a field of edit operators in the memory means, register means for storing said edit operators, means for transferring the identified edit operators from said memory means to said edit operator register means, and editing means responsive to an edit instruction stored in said instruction register means for responding to the series of edit operators stored in said edit operator register means for transferring a source field of data in the memory means to a destination field in the memory means editing the source field of data as it is transferred as specified by the stored edit operators.

20. In a computer as defined in claim 19 wherein said edit instruction comprises an address referencing a series of edit operators in the memory means and a value identifying the number of edit operators in the referenced series, means for counting the number of edit operators transferred to said edit operator register means, and means for causing a new program instruction to be transferred from the memory means to the program instruction register means when the number of edit operators identified in a stored edit instruction has been counted.

21. In a computer having editing apparatus the combination comprising memory means, register means for storing program instructions including an edit instruction which identifies the location of source and destination fields for data in the memory means and the location and number of a series of edit operators, register means for storing said edit operators, means for transferring the number of identified edit operators from said memory means to said edit operator register means specified by a stored edit instruction, and editing means responsive to an edit instruction stored in said instruction register means for responding to a series of edit operators stored in said edit operator register means for transferring data in the memory means from an identified source field to an identified destination field in the memory means editing the source field of data as it transferred as specified by the stored edit operators.

22. In a computer having editing apparatus the combination comprising memory means having a table of codes, each table code being representative of a character and being stored in a predetermined memory location, a series of edit operators in said memory means, said series of edit operators including an insert float edit operator having both an operator code specifying that a leading zero character in a source field in the memory means is to be converted to a code representative of another character and a symbol code corresponding to one of said table memory locations, means responsive to said edit operators for selectively and serially transferring characters from a source field to a destination field in the memory means and including editing means responsive to each of said insert float edit operators for replacing a leading zero character in such source field with a code representative of a blank and responsive to the insert float edit operator and the first non-zero source character for obtaining the code from the table location in the memory means corresponding to the symbol code in the insert float edit operator and for inserting the obtained code into the destination field preceding the first non-zero character.

23. In a computer as defined in claim 22 including means for monitoring the characters being serially transferred from the source to the destination field and including means for storing an indication after having detected the first non-zero source character, said edit operators include an insert suppress edit operator having both an operator code specifying that a leading zero character in a source field in the memory means is to be converted to a blank and a symbol code corresponding to one of said table memory locations, said editing means including means responsive to an insert suppress edit operator for inserting a code representative of a blank into the destination field in the absence of said stored indication and responsive to the stored indication for obtaining the code from the table location corresponding to the symbol code in the insert suppress mark operator and for inserting the obtained code into the destination field.

24. In a computer as defined in claim 22 including means for monitoring the characters being serially transferred from the source to the destination field and including means for storing an indication after having detected the first non-zero source character, said edit operators including an end float operator specifying that if the first non-zero source character has not been reached that a character from the table of codes is to be placed into the destination field in the memory means, said editing means including means responsive to an end float operator and the absence of said stored indication for obtaining a preselected code from the table of codes in the memory means and for inserting same into the destination field.

25. In a computer as defined in claim 24 wherein the last named means is operative in response to an end float operator and the presence of said stored indication for executing the next edit operator in sequence without alteration of said source field for such end float operator.

26. In a computer as defined in claim 25 wherein said end float operator contains an operator code and a symbol code corresponding to one of said table memory locations, the means responsive to an end float operator being responsive to the presence of said end float operator code and the absence of the stored indication for obtaining the code from the table location corresponding to the symbol code in the end float operator for insertion in said source field.

27. In a computer having editing apparatus the combination comprising memory means having a table of codes, each table code being representative of a character and being stored in a predetermined memory location, register means for storing program instructions identifying source and destination fields for data characters in said memory means and for identifying a field for edit operators in said memory means, said edit operators including an insert float edit operator having both an operator code specifying that a leading zero character in the source field is to be converted to a code representative of another character and a symbol code corresponding to one of said table memory locations, edit operator register means, means for transferring the identified edit operators from said memory means to said edit operator register means, means responsive to a stored edit instruction and stored edit operators for selectively and serially transferring characters from the identified source field to the identified destination field and including editing means responsive to each insert float edit operator for replacing a leading zero character in the source field with a code representative of a blank and responsive to the insert float edit operator and the first non-zero source character for obtaining the code from the table location in the memory means corresponding to the symbol code in the insert float edit operator and for inserting the obtained code into the destination field preceding the first non-zero character.

References Cited

UNITED STATES PATENTS

| | | | |
|---|---|---|---|
| 3,119,098 | 1/1964 | Meade | 340—172.5 |
| 3,235,848 | 2/1966 | King et al. | 340—172.5 |
| 3,343,139 | 9/1967 | Ulrich | 340—172.5 |
| 3,346,850 | 10/1967 | Wehrig | 340—172.5 |
| 3,351,915 | 11/1967 | Fought et al. | 340—172.5 |

GARETH D. SHAW, *Primary Examiner.*

JOHN P. VANDENBURG, *Assistant Examiner.*

PO-1050
(5/69)

UNITED STATES PATENT OFFICE
CERTIFICATE OF CORRECTION

Patent No. 3,454,929 Dated July 8, 1969

Inventor(s) D.P. Hynes and Donald E. Knuth

It is certified that error appears in the above-identified patent and that said Letters Patent are hereby corrected as shown below:

Col. 5, line 7, "iput" should read --input--;
Col. 9, line 21, "celared" should read --cleared--;
Col. 11, line 3, "1b" (both instances) should read -- ƀ --;
Col. 11, line 11, "1b" should read -- ƀ --; Col. 23, line 48, "CONT" should read --COUNT--; Col. 23, line 59, "SC=1" should read --SC+1--; Col. 25, between lines 39 and 40, insert --INSERT ON - --; Col. 26, line 74, change "200" to read --204--; Col. 31, TABLE XVI, under C-ADDRESS, change "204" to read --304--; Col. 33, line 50, after "non" insert --zero--; Col. 37, line 38, after "it" insert --is--.

SIGNED AND
SEALED
APR 7 1970

(SEAL)
Attest:

Edward M. Fletcher, Jr.
Attesting Officer

WILLIAM E. SCHUYLER, JR.
Commissioner of Patents